(12) United States Patent
Balasubramanian et al.

(10) Patent No.: US 11,419,333 B2
(45) Date of Patent: Aug. 23, 2022

(54) COMPOSITIONS AND METHODS FOR BIOFILM REMOVAL

(71) Applicant: ChampionX USA Inc., Sugarland, TX (US)

(72) Inventors: Ramakrishnan Balasubramanian, Apple Valley, MN (US); Ian Alexander Richardson, Sugar Land, TX (US); Duy T. Nguyen, Sugar Land, TX (US)

(73) Assignee: ChampionX USA Inc., Sugar Land, TX (US)

( * ) Notice: Subject to any disclaimer, the term of this patent is extended or adjusted under 35 U.S.C. 154(b) by 507 days.

(21) Appl. No.: 16/251,548

(22) Filed: Jan. 18, 2019

(65) Prior Publication Data

US 2019/0223434 A1   Jul. 25, 2019

Related U.S. Application Data

(60) Provisional application No. 62/619,215, filed on Jan. 19, 2018.

(51) Int. Cl.
*A01N 43/16* (2006.01)
*A01N 25/30* (2006.01)
*A01N 47/12* (2006.01)
*C09K 8/524* (2006.01)
*C09K 8/52* (2006.01)
*C09K 8/54* (2006.01)

(52) U.S. Cl.
CPC ............ *A01N 43/16* (2013.01); *A01N 25/30* (2013.01); *A01N 47/12* (2013.01); *C09K 8/524* (2013.01); *C09K 8/52* (2013.01); *C09K 8/54* (2013.01); *C09K 2208/32* (2013.01)

(58) Field of Classification Search
CPC ........ A01N 43/16; A01N 25/30; A01N 47/12; C09K 8/524; C09K 8/52; C09K 8/54; C09K 2208/32
See application file for complete search history.

(56) References Cited

U.S. PATENT DOCUMENTS

| 5,627,144 A | 5/1997 | Urfer et al. |
| 5,635,469 A | 6/1997 | Fowler et al. |
| 6,627,612 B1 | 9/2003 | O'Lenick, Jr. et al. |
| 6,800,741 B1 | 10/2004 | O'Lenick, Jr. |
| 6,881,710 B1 | 4/2005 | O'Lenick, Jr. et al. |
| 6,958,315 B1 | 10/2005 | Anderson et al. |
| 7,008,930 B1 | 3/2006 | O'Lenick, Jr. et al. |
| 7,045,506 B1 | 5/2006 | O'Lenick, Jr. et al. |
| 7,084,129 B1 | 8/2006 | Smith et al. |
| 7,087,571 B1 | 8/2006 | O'Lenick, Jr. et al. |
| 7,507,399 B1 | 3/2009 | O'Lenick, Jr. |
| 8,262,805 B2 | 9/2012 | Hodge et al. |
| 2006/0137879 A1 | 6/2006 | Chan |
| 2008/0272342 A1 | 11/2008 | Guzmann et al. |
| 2010/0086576 A1* | 4/2010 | Myntti .................... A01N 25/30 424/405 |
| 2011/0312867 A1 | 12/2011 | Hodge et al. |
| 2013/0256590 A1 | 10/2013 | Baseeth et al. |
| 2014/0200168 A1 | 7/2014 | Misra et al. |
| 2014/0251605 A1 | 9/2014 | Hera |
| 2014/0251614 A1 | 9/2014 | Muthusamy et al. |
| 2014/0256603 A1 | 9/2014 | Muthusamy et al. |
| 2015/0010429 A1 | 1/2015 | Hatchman et al. |
| 2015/0126417 A1 | 5/2015 | Hatchman et al. |
| 2015/0272124 A1* | 10/2015 | Pedersen ................ A01N 33/12 514/635 |

FOREIGN PATENT DOCUMENTS

| WO | 2016/186663 A1 | 11/2016 |
| WO | 2017/086918 A1 | 5/2017 |

OTHER PUBLICATIONS

Colonial Chemical, Inc., "Poly Suga(R) Glycinate," 2 pages, 2014.
Colonial Chemical, Inc., "Poly Suga(R) Quat Series," 4 pages, 2009.
Colonial Chemical, Inc., "Poly Suga(R) Quat," 4 pages, Jun. 2017.
Hussein, M. H. M., et al., "Preparation of Some Eco-friendly Corrosion Inhibitors Having Antibacterial Activity from Sea Food Waste," Journal of Surfactants and Detergents, 2013, pp. 233-242, vol. 16, No. 2.
O'Toole, G. A., "Microtiter Dish Biofilm Formation Assay," Journal of Visualized Experiments, 2011, 2 pages, vol. 47.
Negm, N. A., et al., "Environmentally Friendly Surface Active Agents and Their Applications," Surfactants in Tribology, Chapter 8, Mar. 2013, pp. 147-193.
Paulino, B. N., et al., "Current Status in Biotechnological Production and Applications of Glycolipid Biosurfactants," Applied Microbiology and Biotechnology, 2016, pp. 10265-10293, vol. 100, No. 24.
Prabha, S. S., et al., "Corrosion Problems in Petroleum Industry and Their Solution," European Chemical Bulletin, 2014, pp. 300-307, vol. 3, No. 3.
Tiu, B. D. B., et al., "Polymeric Corrosion Inhibitors for the Oil and Gas Industry: Design Principles and Mechanism," Reactive and Functional Polymers, 2015, pp. 25-45, vol. 95.

* cited by examiner

*Primary Examiner* — Genevieve S Alley
(74) *Attorney, Agent, or Firm* — Stinson LLP

(57) ABSTRACT

Methods for removing biofilm or preventing biofilm formation from surfaces are provided, the methods comprising applying compositions to the surface to remove the biofilm or inhibit its formation, the compositions comprising polymers derived from alkyl polyglucosides functionalized with cationic side chains.

18 Claims, 9 Drawing Sheets

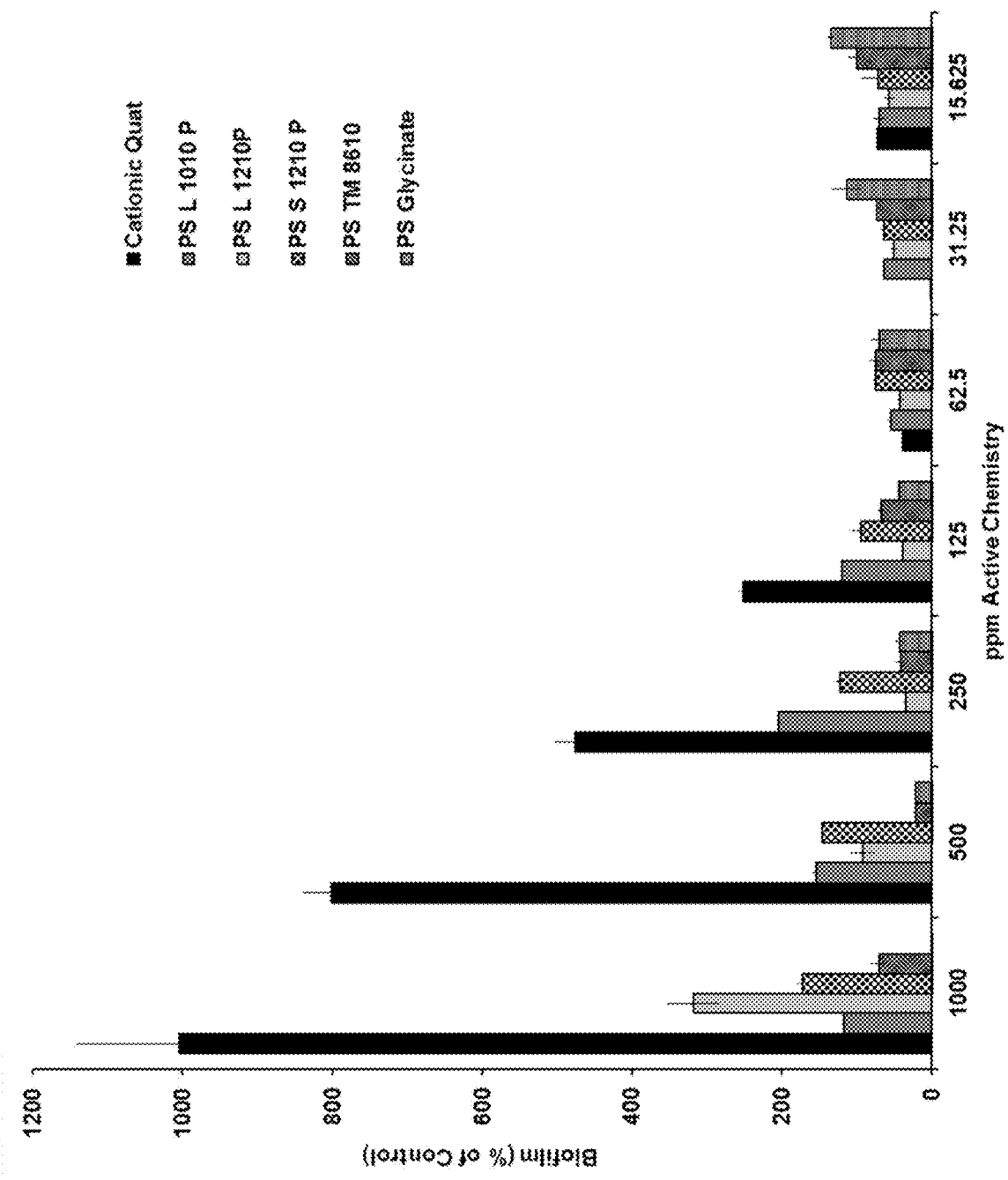

COMPOSITIONS AND METHODS FOR BIOFILM REMOVAL

CROSS REFERENCE TO RELATED APPLICATIONS

This application claims priority to U.S. Provisional Patent Application Ser. No. 62/619,215 filed on Jan. 19, 2018, the disclosure of which is incorporated herein by reference in its entirety.

STATEMENT REGARDING FEDERALLY SPONSORED RESEARCH OR DEVELOPMENT

Not applicable

THE NAMES OF PARTIES TO A JOINT RESEARCH AGREEMENT

Not applicable

REFERENCE TO A SEQUENCE LISTING, TABLE, OR COMPUTER PROGRAM LISTING APPENDIX SUBMITTED ON A COMPACT DISC AND AN INCORPORATION—BY-REFERENCE OF THE MATERIAL ON A COMPACT DISC

Not applicable

FIELD OF THE INVENTION

Compositions are provided for removing biofilm, inhibiting the formation of biofilm, and/or sterilizing at a surface of a wellbore or other oilfield equipment.

BACKGROUND OF THE INVENTION

Oilfield systems are subjected to increased risks associated with microbial control including: $H_2S$ production, microbial influenced corrosion (MIC) and biofouling. When MIC is suspected in a system, the main area of concern becomes the biofilm, or sessile organisms, on the surface of the pipeline.

A biofilm is an assemblage of microbial cells that is irreversibly associated (not removed by gentle rinsing) with a surface and enclosed in a matrix of primarily polysaccharide material. In contrast to the planktonic state where microorganisms exist in a single-cell state, the biofilm state serves to protect a population of microorganisms from environmental stresses and is very tenacious and resistant to biocides and antimicrobials. This means that commonly used biocides, such as tetrakis-(hydroxymethyl) phosphonium sulfate (THPS), glutaraldehyde, and quaternary ammonium compounds, have limited efficacy against established biofilms which are primarily responsible for MIC observed.

Thus, for the effective removal of microbial populations from systems associated with oil and gas production, a need exists to effectively remove biofilm already formed and inhibit its formation and growth. This strategy in combination with known biocides, corrosion inhibitors, or foamers has the potential to effectively eliminate the major risk factors and problems associated with microbial growth in oilfield systems.

BRIEF SUMMARY OF THE INVENTION

A method is provided for removing biofilm on a surface, inhibiting formation of a biofilm on the surface and/or sanitizing the surface, the method comprising either: contacting the surface with an effective amount of a composition, or adding the composition to a fluid which contacts the surface to remove at least a portion of the biofilm or inhibit formation of the biofilm on the surface, the composition comprising:

a) an alkyl polyglucoside which is a reaction product of a polymerization mixture comprising compound 1, compound 2, a polymerizing agent and a functionalizing agent, the compound 1 having structure (1):

(1)

[structure of compound 1: pyranose ring with RO, OH, OH, OH, OH substituents]

wherein R is an alkylene having 8 to 22 carbon atoms;
the compound 2 having structure (2):

(2)

[structure of compound 2: disaccharide with RO, OH groups]

the polymerizing agent having structure (3):

$$Cl-CH_2CH(OH)CH_2Cl \quad (3); \text{ and}$$

the functionalizing agent having structure (4):

(4)

$$Cl\text{–}CH_2\text{–}CH(OH)\text{–}CH_2\text{–}\overset{\oplus}{N}(CH_3)_2\text{–}R^1$$

wherein $R^1$ is an alkylene having 1 to 35 carbons.

A use of a composition for removing a biofilm from a surface, inhibiting the formation of a biofilm on the surface and/or sanitizing the surface is provided, the composition comprising the alkyl polyglucoside as described herein.

Other objects and features will be in part apparent and in part pointed out hereinafter.

BRIEF DESCRIPTION OF THE SEVERAL VIEWS OF THE DRAWING

FIG. 6A is a bar graph quantifying the amount of biofilm grown in polystyrene wells following a pretreatment with various POLY SUGA QUATS (alkyl polyglucosides).

DETAILED DESCRIPTION OF THE INVENTION

Figure 1:
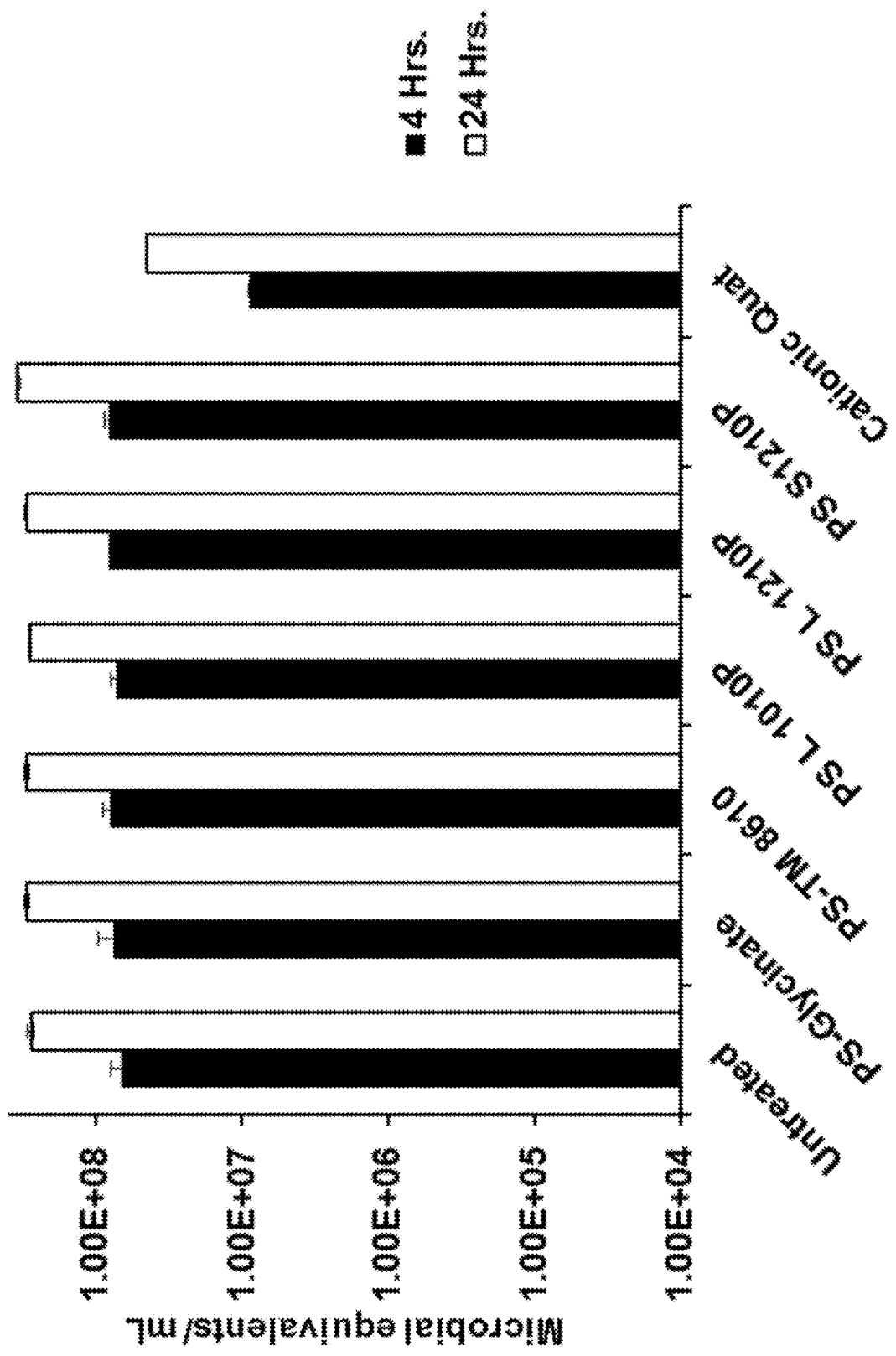
FIG. 1 is a bar graph depicting microbial population levels (planktonic) after 4 or 24 hours of treatment with individual POLY SUGA QUATs (alkyl polyglucosides) in vitro.

Disclosed herein are methods for removing biofilm, preventing biofilm formation, and/or sanitizing a surface. The methods comprise either: contacting the surface with an effective amount of a composition, or adding the composition to a fluid which contacts the surface to remove at least a portion of the biofilm or inhibit formation of the biofilm on the surface.

The compositions contain polymeric cationic quaternary compounds (quats) that are naturally derived and have an environmentally friendly, low toxicity profile. This is an advantage over non-polymeric cationic quats currently used that typically have a toxicity profile restricting their use in regions that have very strict environmental regulations. In contrast, the compositions disclosed herein comprise polymeric cationic quats that are REACH registered and have already passed strict environmental regulations. Further, they are also superior at both removing biofilm and preventing its formation when compared to traditional non-polymeric quats typically used for biofilm removal. They also show effective biocidal protection especially when combined with commonly used biocides.

The composition comprises at least one polymer containing an alkyl poly glucoside backbone with a cationic side chain. The polymer can be the reaction product of a polymerization mixture comprising compound 1, compound 2, a polymerizing agent and a functionalizing agent, the compound 1 having structure (1):

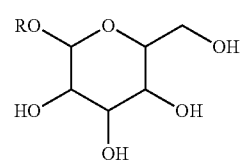

(1)

wherein R is an alkylene having 8 to 22 carbon atoms;
the compound 2 having structure (2):

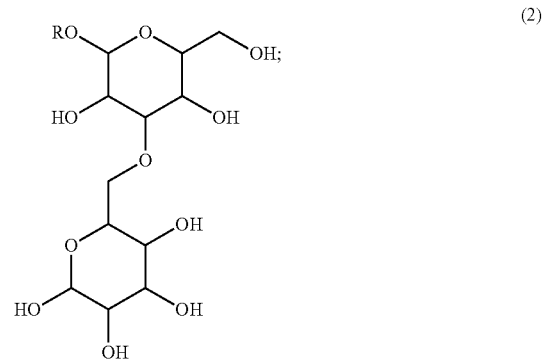

(2)

the polymerizing agent having structure (3):

$$Cl-CH_2CH(OH)CH_2Cl \quad (3); and$$

the functionalizing agent having structure (4):

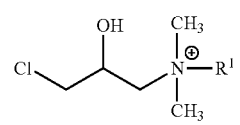

(4)

R of structures (1) and (2) can be an alkyl of 8 to 16 carbons. R can be an alkyl having 8 to 10 carbons. R can be an alkyl having 12 to 16 carbons.

$R^1$ of structure (4) can be an alkyl with 1 to 18 carbons. For example, $R^1$ can be a methyl, lauryl, or stearyl.

The alkyl polyglucoside polymer can have the structure (5):

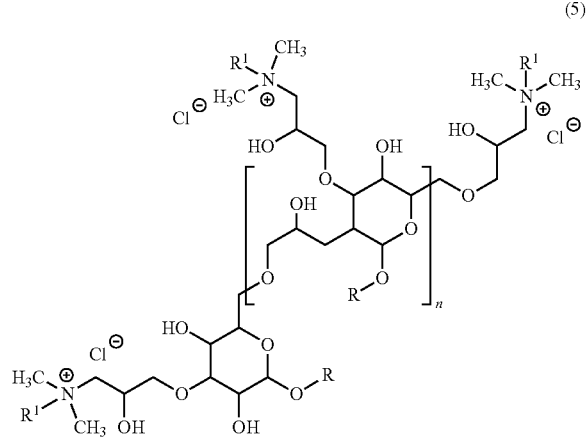

(5)

wherein each R is an alkylene having 8 to 22 carbons; each $R^1$ is an alkylene having 1 to 18 carbons; and n is an integer from 1 to 20. For example, R can be a decyl, lauryl, or coco and $R^1$ can be a methyl, lauryl or stearyl and n can be an integer from 1 to 11, an integer from 2 to 6 or an integer from 4 to 6.

The alkyl polyglucoside can have the structure (6):

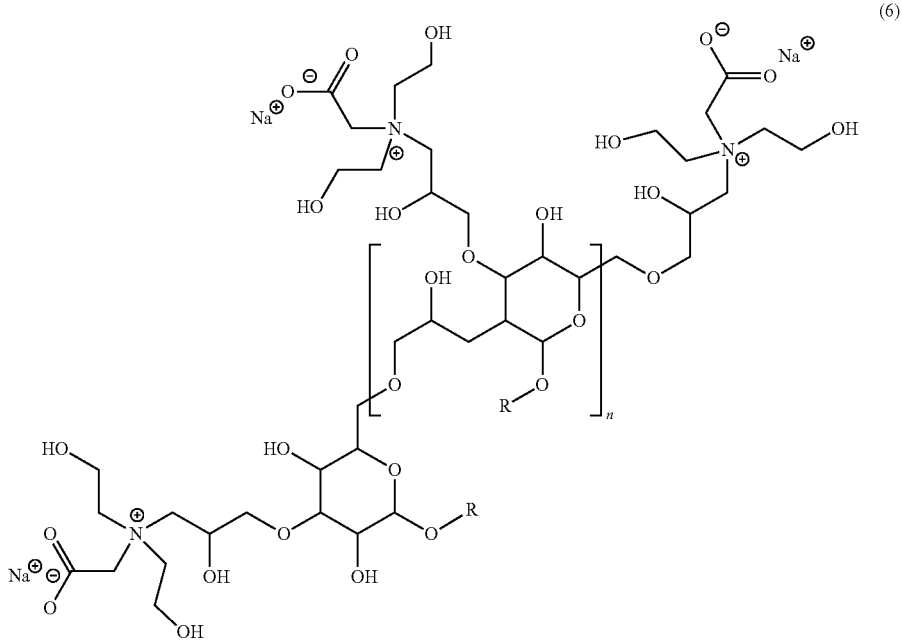

wherein R is an alkylene having 8 to 22 carbons and n is an integer from 1 to 20. For example, R can be a coco or a lauryl and n can be an integer from 1 to 11, an integer from 2 to 6 or an integer from 4 to 6.

The alkyl polyglucoside can comprise a functionalized polyglycoside derivative as described in the U.S. Pat. No. 7,507,399, incorporated herein by reference.

The alkyl polyglucoside can comprise a functionalized polyglycoside commercially sold as the POLY SUGA Quat Series by Colonial Chemical, Inc. For example, the alkyl polyglucoside can comprise POLY SUGA Quat TM-8610P (Polyquarternium-77), POLY SUGA Quat TM-1218P (Poly-Quaternium-82), POLY SUGA Quat S-1210P (Polyquaternium-81), POLY SUGA Quat L-1210P (Polyquaternium-80), POLY SUGA Quat L-1010P (Polyquaternium-78) or any combination thereof.

The alkyl polyglucoside may alternatively, or in addition, comprise a POLY SUGA Glycinate (Colonial Chemical). For example, the glycinate can comprise sodium bis-hydroxyethylglycinate coco-glucosides crosspolymer, sodium bis-hydroxyethylglycinate lauryl-glucosides crosspolymer or any combination thereof.

Most preferably the alkyl polyglucoside comprises POLY SUGA Quat TM-8610 and/or POLY SUGA Quat S-1210P.

The concentration of the alkyl polyglucoside can be about 1 wt. % to about 50 wt. %, about 1 wt. % to about 45 wt. %, about 1 wt. % to about 40 wt. %, about 1 wt. % to about 35 wt. %, about 1 wt. % to about 30 wt. %, about 5 wt. % to about 25 wt. %, about 10 wt. % to about 25 wt. % or about 15 to about 25 wt. %, based on the total weight of the composition. The concentration of the alkyl polyglucoside can be about 1 wt. %, about 2 wt. %, about 3 wt. %, about 4 wt. %, about 5 wt. %, about 6 wt. % about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, about 40 wt. %, about 41 wt. %, about 42 wt. %, about 43 wt. %, about 44 wt. %, about 45 wt. %, about 46 wt. %, about 47 wt. %, about 48 wt. %, about 49 wt. %, or about 50 wt. %, based on the total weight of the composition. Preferably, the concentration of the alkyl polyglucoside is about 20 wt. %, based on the total weight of the composition.

The composition can further comprise a non-oxidizing biocide, a foamer, a corrosion inhibitor or any combination thereof. Suitable non-oxidizing biocides, foamers and corrosion inhibitors can be any commonly used in the oil and petroleum industry. Suitable biocides, foamers and corrosion inhibitors that can be used are described below.

Biocides

The composition can comprise a non-oxidizing biocide. The non-oxidizing biocide can comprise an aldehyde, an amine type compound, a halogenated compound, a sulfur compound, a quaternary phosphonium salt, a diphenyliodonium salt or any combination thereof.

The non-oxidizing biocide can comprise an aldehyde. The aldehyde can be, for example, formaldehyde, glutaraldehyde or acrolein.

The non-oxidizing biocide can comprise a quaternary amine compound. The a quaternary amine compound can comprise, for example, alkylamine, hydroxalkylamine, aklyarylamine, arylakylamine, an arylamine or a quaternary ammonium salt. The quaternary ammonium salt can comprise, for example, tetramethyl ammonium chloride, tetraethyl ammonium chloride, tetrapropyl ammonium chloride, tetrabutyl ammonium chloride, tetrahexyl ammonium chloride, tetraoctyl ammonium chloride, benzyltrimethyl ammonium chloride, benzyltriethyl ammonium chloride, phenyltrimethyl ammonium chloride, phenyltriethyl ammonium chloride, cetyl benzyldimethyl ammonium chloride, or a hexadecyl trimethyl ammonium chloride. The quaternary ammonium salt can also comprise, for example, a dimethyl alkyl benzyl quaternary ammonium compound, a monomethyl dialkyl benzyl quaternary ammonium compound, a trimethyl benzyl quaternary ammonium compound, or a trialkyl benzyl quaternary ammonium compound.

The non-oxidizing biocide can comprise a halogenated compound and/or a sulfur compound. The halogenated compound can comprise, for example, 2-bromo-2-nitropropane-3-diol. The sulfur compound can comprise, for example, an isothiazolone, a carbamate, or a metronidazole.

The non-oxidizing biocide can comprise a quaternary phosphonium salt. The quaternary phosphonium salt can comprise, for example, alkyltris(hydroxyorgano)phosphonium salt (eg., a $C_1$-$C_3$ alkyltris(hydroxyorgano) phosphonium salt), an alkenyltris(hydroxyorgano) phosphonium salt (eg., a $C_2$-$C_3$-alkenyltris(hydroxymethyl)phosphonium salt) and/or tetrakis(hydroxyorgano)phosphonium salt. The tetrakis(hydroxyorgano)phosphonium salt can comprise, for example, tetrakis(hydroxymethyl)-phosphonium sulfate (THPS) tetrakis(hydroxymethyl) phosphonium chloride, tetrakis(hydroxymethyl)phosphonium phosphate, tetrakis(hydroxymethyl)phosphonium formate, tetrakis(hydroxymethyl)phosphonium acetate, and/or tetrakis(hydroxymethyl) phosphonium oxalate. Preferably, the tetrakis (hydroxyorgano)phosphonium salt comprises tetrakis (hydroxymethyl)-phosphonium sulfate (THPS).

The concentration of the non-oxidizing biocide can be about 1 to about 50 wt. %, about 1 to about 25 wt. %, about 5 to about 20 wt. % or about 5 to about 15 wt. %, based on the total weight of the composition. The concentration of the non-oxidizing biocide can be about 1 wt. %, about 2 wt. %, about 3 wt. %, about 4 wt. %, about 5 wt. %, about 6 wt. % about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, about 40 wt. %, about 41 wt. %, about 42 wt. %, about 43 wt. %, about 44 wt. %, about 45 wt. %, about 46 wt. %, about 47 wt. %, about 48 wt. %, about 49 wt. %, or about 50 wt. %, based on the total weight of the composition. For example, the concentration of the non-oxidizing biocide can be about 8 wt. % or about 10 wt. % based on the total weight of the composition.

Corrosion Inhibitors

The composition can comprise a corrosion inhibitor. The corrosion inhibitor can comprise an imidazoline compound, a quaternary ammonium compound, a pyridinium compound, a phosphate ester or any combination thereof.

The corrosion inhibitor can comprise an imidazoline. The imidazoline can comprise, for example, an imidazoline derived from a diamine, such as ethylene diamine (EDA), diethylene triamine (DETA) or triethylene tetraamine (TETA), and a long chain fatty acid such as tall oil fatty acid (TOFA). The imidazoline can comprise an imidazoline of Formula (7) or an imidazoline derivative. Representative imidazoline derivatives include an imidazolinium compound of Formula (8) or a bis-quaternized compound of Formula (9).

The corrosion inhibitor can include an imidazoline of Formula (7):

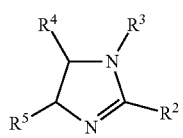

(7)

wherein $R^2$ is a $C_1$-$C_{20}$ alkyl or a $C_1$-$C_{20}$ alkoxyalkyl group; each $R^4$ and $R^5$ are independently hydrogen or a $C_1$-$C_6$ alkyl group, and $R^3$ is hydrogen, $C_1$-$C_6$ alkyl, $C_1$-$C_6$ hydroxyalkyl, or $C_1$-$C_6$ arylalkyl. Preferably, the imidazoline can include an $R^2$ which is the alkyl mixture typical in tall oil fatty acid (TOFA), and $R^3$, $R^4$ and $R^5$ can each be hydrogen.

The corrosion inhibitor can include an imidazolinium compound of Formula (8):

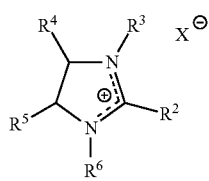

(8)

wherein $R^2$ is a $C_1$-$C_{20}$ alkyl or a $C_1$-$C_{20}$ alkoxyalkyl group; $R^3$ and $R^6$ are independently hydrogen, $C_1$-$C_6$ alkyl, $C_1$-$C_6$ hydroxyalkyl, or $C_1$-$C_6$ arylalkyl; $R^4$ and $R^5$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound can include an $R^2$ which is the alkyl mixture typical in tall oil fatty acid (TOFA), $R^3$, $R^4$ and $R^5$ can each be hydrogen, $R^6$ can be hydroxyethyl, and $X^-$ can be chloride. For example, the imidazolinium compound can include 1-benzyl-1-(2-hydroxyethyl)-2-tall-oil-2-imidazolinium chloride.

The corrosion inhibitor can comprise a bis-quaternized compound having the formula (9):

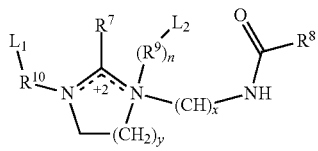

(9)

wherein:

$R^7$ and $R^8$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof;

$R^9$ and $R^{10}$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof;

$L_1$ and $L_2$ are each independently absent, H, —COOH, —SO$_3$H, —PO$_3$H$_2$, —COOR$_5$, —CONH$_2$, —CONHR$^{11}$, or —CON(R$^{11}$)$_2$;

$R^{11}$ is each independently a branched or unbranched alkyl, aryl, alkylaryl, alkylheteroaryl, cycloalkyl, or heteroaryl group having from 1 to about 10 carbon atoms;

n is 0 or 1, and when n is 0, $L_2$ is absent or H;

x is from 1 to about 10; and y is from 1 to about 5.

Preferably, $R^7$ and $R^8$ can each be, independently, $C_6$-$C_{22}$ alkyl, $C_8$-$C_{20}$ alkyl, $C_{12}$-$C_{18}$ alkyl, $C_{16}$-$C_{18}$ alkyl, or a combination thereof, $R^9$ and $R^{10}$ can be $C_1$-$C_{10}$ alkylene, $C_2$-$C_8$ alkylene, $C_2$-$C_6$ alkylene, or $C_2$-$C_3$ alkylene; n can be 0 or 1; x can be 2; y can be 1; $R^9$ and $R^{10}$ can be —C$_2$H$_2$—; $L_1$ can be —COOH, —SO$_3$H, or —PO$_3$H$_2$; and $L_2$ can be absent, H, —COOH, —SO$_3$H, or —PO$_3$H$_2$. For example, $R^7$ and $R^8$ can be derived from a mixture of tall oil fatty acids and can be predominantly a mixture of $C_{17}H_{33}$ and $C_{17}H_{31}$ or can be $C_{16}$-$C_{18}$ alkyl; $R^9$ and $R^{10}$ can be $C_2$-$C_3$ alkylene such as —C$_2$H$_2$—; n can be 1 and $L_2$ can be —COOH or n can be 0 and $L_2$ can be absent or H; x can be 2; y can be 1; $R^9$ and $R^{10}$ can each be —C$_2$H$_2$—; and $L_1$ can be —COOH. For example, $R^7$ and $R^8$ can be derived from a mixture of tall oil fatty acids and can be predominantly a mixture of $C_{17}H_{33}$ and $C_{17}H_{31}$, x can be 2, y can be 1, n can be 1, $R^9$ and $R^{10}$ can be —C$_2$H$_2$—, and $L_1$ and $L_2$ can each be, independently, —CO$_2$H, —SO$_3$H, or —PO$_3$H$_2$.

It should be appreciated that the number of carbon atoms specified for each group of formula (9) refers to the main chain of carbon atoms and does not include carbon atoms that may be contributed by substituents.

The corrosion inhibitor can include a bis-quaternized imidazoline compound having the formula (9) wherein $R^7$ and $R^8$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R^{10}$ is $C_1$-$C_{10}$ alkylene, $C_2$-$C_8$ alkylene, $C_2$-$C_6$ alkylene, or $C_2$-$C_3$ alkylene; x is 2; y is 1; n is 0; $L_1$ is-COOH, —SO$_3$H, or —PO$_3$H$_2$; and $L_2$ is absent or H. Preferably, a bis-quaternized compound can have the formula (9) wherein $R^7$ and $R^8$ are each independently $C_{16}$-$C_{18}$ alkyl; $R_4$ is —C$_2$H$_2$—; x is 2; y is 1; n is 0; $L_1$ is-COOH, —SO$_3$H, or —PO$_3$H$_2$ and $L_2$ is absent or H.

The corrosion inhibitor can comprise a pyridinium compound such as those represented by Formula (10):

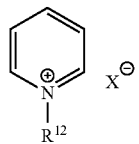

(10)

wherein $R^{12}$ is an alkyl group, an aryl group, or an arylalkyl group, wherein said alkyl groups have from 1 to about 18 carbon atoms and X$^-$ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a $C_1$-$C_6$ hydrocarbyl group. Preferably, the pyridinium compound includes benzyl pyridinium chloride.

The corrosion inhibitor can include a quaternary ammonium compound of Formula (11):

(11)

wherein $R^{13}$, $R^{14}$, and $R^{15}$ are independently $C_1$ to $C_{20}$ alkyl, $R^{16}$ is methyl or benzyl, and X$^-$ is a halide or methosulfate.

Suitable alkyl, hydroxyalkyl, alkylaryl, arylalkyl or aryl amine quaternary salts include those alkylaryl, arylalkyl and aryl amine quaternary salts of the formula [N$^+$R$^{5a}$R$^{6a}$R$^{7a}$R$^{8a}$][X$^-$] wherein R$^{5a}$, R$^{6a}$, R$^{7a}$, and R$^{8a}$ contain one to 18 carbon atoms, and X is Cl, Br or I. For the quaternary salts, R$^{5a}$, R$^{6a}$, R$^{7a}$, and R$^{8a}$ can each be independently alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula [N$^+$R$^{5a}$R$^{6a}$R$^{7a}$R$^{8a}$][X$^-$] wherein R$^{5a}$, R$^{6a}$, R$^{7a}$, and R$^{8a}$ contain one to 18 carbon atoms and at least one aryl group, and X is Cl, Br or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has 6 to 24 carbon atoms, 10 and 18 carbon atoms, or 12 to 16 carbon atoms. The quaternary ammonium salt can include a benzyl trialkyl quaternary ammonium salt, a benzyl triethanolamine quaternary ammonium salt, or a benzyl dimethylaminoethanolamine quaternary ammonium salt.

The corrosion inhibitor can include additional corrosion inhibitors such as phosphate esters, monomeric or oligomeric fatty acids, or alkoxylated amines.

The corrosion inhibitor can comprise a phosphate ester. Suitable mono-, di- and tri-alkyl as well as alkylaryl phosphate esters and phosphate esters of mono, di, and triethanolamine typically contain between from 1 to 18 carbon atoms. Preferred mono-, di- and trialkyl phosphate esters, alkylaryl or arylalkyl phosphate esters can include those prepared by reacting a $C_3$-$C_{18}$ aliphatic alcohol with phosphorous pentoxide. The phosphate intermediate interchanges its ester groups with triethylphosphate producing a more broad distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor can include a monomeric or oligomeric fatty acid. Preferred monomeric or oligomeric fatty acids include $C_{14}$-$C_{22}$ saturated and unsaturated fatty acids as well as dimer, trimer and oligomer products obtained by polymerizing one or more of such fatty acids.

The corrosion inhibitor can comprise an alkoxylated amine. The alkoxylated amine can include an ethoxylated alkyl amine. The alkoxylated amine can include ethoxylated tallow amine.

The concentration of the corrosion inhibitor can be about 1 to about 50 wt. %, about 1 to about 25 wt. %, about 5 to about 20 wt. %, about 5 to about 15 wt. %, or about 5 to 10 wt. %, based on the total weight of the composition. The concentration of the corrosion inhibitor can be about 1 wt. %, about 2 wt. %, about 3 wt. %, about 4 wt. %, about 5 wt. %, about 6 wt. % about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, about 40 wt. %, about 41 wt. %, about 42 wt. %, about 43 wt. %, about 44 wt. %, about 45 wt. %, about 46 wt. %, about 47 wt. %, about 48 wt. %, about 49 wt. %, or about 50 wt. %, based on the total weight of the composition. For example, the concentration of the corrosion inhibitor can be about 10 wt. %, based on the total weight of the composition.

Foamers

The composition can comprise one or more foamers. Suitable foamers include anionic surfactants, cationic surfactants, nonionic surfactants, amphoteric surfactants, zwitterionic surfactants, fluoro-surfactants or any combination thereof.

Suitable anionic surfactants can comprise an alkyl carboxylate, an alkyl sarcosinate, an alkyl sulfosuccinate, a sulfosuccinamate, an alkyl phosphate, an alkyl sulfonate, an alkyl sulfate or any combination thereof. For example, the alkyl carboxylate can comprise a fatty carboxylate or an alkyl ether carboxylate; the alkyl sulfosuccinate can comprise a monoalkylsulfosuccinate or dialkylsulfosuccinate; the alkyl phosphate can comprise an alkyl phosphate ester or an ethoxylated alkyl phosphate ester; the alkyl sulfonate can comprise an alkyl aryl sulfonate, an ester sulfonate (eg., a $C_{12}$-$C_{18}$ ester sulfonate), an olefin sulfanate (eg., a $C_{14}$-$C_{24}$ alpha olefin sulfonate or a $C_{15}$-$C_{17}$ internal olefin sulfonate), or a paraffin sulfonate; the alkyl sulfate can comprise an alcohol sulfate or an alcohol ether sulfate (eg., a $C_{13}$-$C_{18}$ alcohol ether sulfate).

Suitable cationic surfactants can comprise a quaternary amine or a quaternary ammonium salt thereof. The quaternary amine can comprise a monoalkyl quaternary amine. For example, the monoalkyl quaternary amine can comprise cocotrimonium chloride, soyatrimonium chloride, stearyltrimonium chloride, and/or behentrimonium chloride. The quaternary amine can include a dialkyl quaternary amine such as a dialkly dimethyl quaternium ammonium salt. For example, the dialkyl dimethyl quaternium ammonium salt can include dicetyldimethyl ammonium chloride, dicocodimethyl ammonium chloride, or distearyldimethyl ammonium chloride.

Suitable nonionic surfactants can comprise an alkoxylate, an amine oxide, a sorbitan ester, a carboxylic compound, a polyalkoxylated glyceride or any combination thereof. For example, the alkoxylate can comprise an alkoxylated alcohol or ether, an alkylphenol alkoxylate, or an alkyl ethoxylate; the amine oxide can comprise an alkyl dimethyl amine oxide, an alkyl-bis (2-hydroxyethyl) amine oxide, an alkyl amidopropyl dimethyl amine oxide, or an alkylamidopropyl-bis(2-hydroxyethyl) amine oxide; sorbitan ester can comprise a polyalkoxylated sorbitan ester; and the carboxylic compound can comprise a carboxylic acid or a carboxylic ether.

Preferably the foamer comprises an amphoteric or zwitterionic surfactant. Suitable amphoteric surfactants include betaines, sultaines, alkylamphoacetates, amphodiacetates, alkylamphopropionates, alkyliminodipropionates, amphodipropionates or any combination thereof. Most preferably the foamer comprises a betaine such as an alkyl betaine, an alkylamido betaine, or a sulfobetaine. For example, the alkyl betaine can comprise an alkyl dimethyl betaine. The alkylamidobetaine can comprise an alkylamido propyl betain such as cocoamido propyl betaine, a capryloamidopropyl betaine, or a caprylamidopropyl betaine. The sulfobetaine can comprise N-decyl-N,N-dimethyl-3-ammonio-1-propanesulfonate or dimethyl-(2-hydroxyethyl)-(3-sulfopropyl) ammonium. A suitable sultane can comprise an alkylamidopropyl hydroxysultane such as lauramidopropyl hydroxysultaine. A suitable amphodiacetate can comprise an alkylamphoacetate. Alternatively, the foamer can comprise a fluoro-surfactant.

The concentration of the foamer can be about 1 to about 50 wt. %, about 10 to about 50 wt. %, about 1 to about 25 wt. %, about 5 to about 20 wt. %, about 5 to about 15 wt. %, or about 5 to 10 wt. %, based on the total weight of the composition. The concentration of the foamer can be about 1 wt. %, about 2 wt. %, about 3 wt. %, about 4 wt. %, about 5 wt. %, about 6 wt. % about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, about 40 wt. %, about 41 wt. %, about 42 wt. %, about 43 wt. %, about 44 wt. %, about 45 wt. %, about 46 wt. %, about 47 wt. %, about 48 wt. %, about 49 wt. %, or about 50 wt. %, based on the total weight of the composition. For example, the concentration of the foamer can be about 10 wt. % based on the total weight of the composition.

The composition can further comprises an additional component selected from the group consisting of an organic solvent, an asphaltene inhibitor, a paraffin inhibitor, a scale inhibitor, a demulsifier, a water clarifier, a dispersant, an emulsion breaker, a pH modifier, a hydrogen sulfide scavenger, a gas hydrate inhibitor, a kinetic hydrate inhibitor and any combination thereof. Suitable additional components are elaborated in the next section.

The additional component of the composition can comprise an organic solvent. The composition can comprise from about 0.1 to about 50 wt. %, from about 1 to about 25 wt. % or from about 5 to about 15 wt. %, based on the total weight of the composition. Preferably, the organic solvent comprises an alcohol, a hydrocarbon, a ketone, an ether, an alkylene glycol, a glycol ether, an amide, a nitrile, a sulfoxide, an ester, a polyol, or a combination thereof. For example, the organic solvent can comprise methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, glycerin, or a combination thereof.

The additional component of the composition can comprise an asphaltene inhibitor. The composition can comprise from about 0.1 to 10 wt. %, from about 0.1 to 5 wt. %, or from about 0.5 to 4 wt. % of an asphaltene inhibitor, based on total weight of the composition. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

The additional component of the composition can comprise a paraffin inhibitor. The composition can comprise from about 0.1 to 10 wt. %, from about 0.1 to 5 wt. %, or from about 0.5 to 4 wt. % of a paraffin inhibitor, based on total weight of the composition. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

The additional component of the composition can comprise a scale inhibitor. The composition can comprise from about 0.1 to 20 wt. %, from about 0.5 to 10 wt. %, or from about 1 to 10 wt. % of a scale inhibitor, based on total weight of the composition. Suitable scale inhibitors include, but are not limited to, phosphates, phosphate esters, phosphoric acids, phosphonates, phosphonic acids, polyacrylamides, salts of acrylamidomethyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AA/AMPS).

The additional component of the composition can comprise a demulsifier. Preferably, the demulsifier comprises an oxyalkylate polymer, such as a polyalkylene glycol. The demulsifier can constitute from about 0.1 to 10 wt. %, from about 0.5 to 5 wt. %, or from about 0.5 to 4 wt. % of the composition, based on total weight of the composition. The demulsifier can constitute 0.5, 1, 1.5, 2, 2.5, 3, 3.5, 4, 4.5 or 5 wt. % of the composition.

The additional component of the composition can comprise a water clarifier. The composition can comprise from about 0.1 to 10 wt. %, from about 0.5 to 5 wt. %, or from about 0.5 to 2 wt. % of a water clarifier, based on total weight of the composition. Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

The additional component of the composition can comprise a dispersant. The composition can comprise from about 0.1 to 10 wt. %, from about 0.5 to 5 wt. %, or from about 0.5 to 4 wt. % of a dispersant, based on total weight of the composition. Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

The additional component of the composition can comprise a pH modifier. The composition can comprise from about 0.1 to 20 wt. %, from about 0.5 to 10 wt. %, or from about 0.5 to 5 wt. % of a pH modifier, based on total weight of the composition. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

The component of the composition can include an emulsion breaker. The composition can comprise from about 0.1 to 10 wt. %, from about 0.5 to 5 wt. %, or from about 0.5 to 4 wt. % of an emulsion breaker, based on total weight of the composition. Suitable emulsion breakers include, but are not limited to, dodecylbenzylsulfonic acid (DDBSA), the sodium salt of xylenesulfonic acid (NAXSA), epoxylated and propoxylated compounds, anionic, cationic and nonionic surfactants, and resins, such as phenolic and epoxide resins.

The component of the composition can include a hydrogen sulfide scavenger. The composition can comprise about 1 to 50 wt. %, from about 1 to 40 wt. %, or from about 1 to 30 wt. % of a hydrogen sulfide scavenger, based on total weight of the composition. Suitable additional hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; triazines (e.g., monoethanolamine triazine, monomethylamine triazine, and triazines from multiple amines or mixtures thereof); condensation products of secondary or tertiary amines and aldehydes, and condensation products of alkyl alcohols and aldehydes.

The component of the composition can include a gas hydrate inhibitor. The composition can comprise from about 0.1 to 25 wt. %, from about 0.5 to 20 wt. %, or from about 1 to 10 wt. % of a gas hydrate inhibitor, based on total weight of the composition. Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

The component of the composition can include a kinetic hydrate inhibitor. The composition can comprise from about 0.1 to 25 wt. %, from about 0.5 to 20 wt. %, or from about 1 to 10 wt. % of a kinetic hydrate inhibitor, based on total weight of the composition. Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

Compositions made according to the invention can further include additional functional agents or additives that provide a beneficial property. For example, additional agents or additives can be sequestrants, solubilizers, lubricants, buffers, cleaning agents, rinse aids, preservatives, binders, thickeners or other viscosity modifiers, processing aids, carriers, water-conditioning agents, foam inhibitors or foam generators, threshold agents or systems, aesthetic enhancing agents (i.e., dyes, odorants, perfumes), or other additives suitable for formulation with a biofilm removing composition, and mixtures thereof. Additional agents or additives will vary according to the particular biofilm removing composition being manufactured and its intended use as one skilled in the art will appreciate.

Alternatively, the compositions can not contain any of the additional agents or additives.

The compositions can be formulated with water. The concentration of water can be about 50 wt. % to about 95 wt. %, from about 55 wt. % to about 90 wt. %, from about 60 wt. % to about 80 wt. %, from about 65 wt. % to about 75 wt. %, from about 66 wt. % to about 74 wt. %, from about 67 wt. % to about 73 wt. %, from about 68 wt. % to about 72 wt. %, from about 69 wt. % to about 71 wt. %, based on the total weight of the composition. Preferably, the concentration of water is about 70 wt. % based on the total weight of the composition.

For example, the composition can comprise an alkyl polyglucoside, a non-oxidizing biocide and a corrosion inhibitor in water.

For example, the composition can comprise an alkyl polyglucoside and a non-oxidizing biocide in water.

Additionally, the biofilm removing, biofilm inhibiting, and/or sanitizing compositions of the invention can be formulated as compositions comprising the following components (Table 1). These formulations include the ranges of the components listed and can optionally include additional agents. Each concentration listed in Table 1 is wt. % based upon the total weight of the composition.

TABLE 1

| Component | 1 | 2 | 3 | 4 | 5 | 6 | 7 | 8 | 9 | 10 | 11 |
|---|---|---|---|---|---|---|---|---|---|---|---|
| Alkyl-Polyglucoside | 1-50 | 1-50 | 1-50 | 1-50 | 1-50 | 1-50 | 1-50 | 1-35 | 1-35 | 1-35 | 1-35 |
| Biocide | 1-50 | — | — | 1-50 | 1-50 | — | — | 1-25 | — | — | 1-25 |
| Corrosion inhibitor | — | 1-50 | — | 1-50 | — | 1-50 | — | — | 1-25 | — | 1-25 |
| Foamer | — | — | 0.1-50 | — | 0.1-50 | 0.1-50 | — | — | — | 10-50 | — |
| Asphaltene inhibitor | 0-5 | 0-5 | 0-5 | 0-5 | 0-5 | 0-5 | 0-5 | 0-5 | 0-5 | 0-5 | 0-5 |
| Scale inhibitor | 0-5 | 0-5 | 0-5 | 0-5 | 0-5 | 0-5 | 0-5 | 0-5 | 0-5 | 0-5 | 0-5 |
| Gas hydrate inhibitor | 0-5 | 0-5 | 0-5 | 0-5 | 0-5 | 0-5 | 0-5 | 0-5 | 0-5 | 0-5 | 0-5 |
| Water | 0-80 | 0-80 | 0-80 | 0-80 | 0-80 | 0-80 | 0-80 | 30-80 | 30-80 | 30-80 | 30-80 |

| Component | 12 | 13 | 14 | 15 | 16 | 17 | 18 | 19 | 20 | 21 | 22 |
|---|---|---|---|---|---|---|---|---|---|---|---|
| Alkyl-Polyglucoside | 1-35 | 1-35 | 1-35 | 1-35 | 5-25 | 5-25 | 5-25 | 5-25 | 5-25 | 5-25 | 5-25 |
| Biocide | 1-25 | — | — | — | 5-10 | — | 5-10 | — | 5-10 | — | — |
| Corrosion inhibitor | — | 1-25 | 1-25 | — | — | 5-10 | 5-10 | — | — | 5-10 | — |
| Foamer | 10-50 | 10-50 | 10-50 | — | — | — | — | — | 10-50 | 10-50 | 10-50 |
| Asphaltene inhibitor | 0-5 | 0-5 | 0-5 | 0-5 | 0-5 | 0-5 | 0-5 | 0-5 | 0-5 | 0-5 | 0-5 |
| Scale inhibitor | 0-5 | 0-5 | 0-5 | 0-5 | 0-5 | 0-5 | 0-5 | 0-5 | 0-5 | 0-5 | 0-5 |
| Gas hydrate inhibitor | 0-5 | 0-5 | 0-5 | 0-5 | 0-5 | 0-5 | 0-5 | 0-5 | 0-5 | 0-5 | 0-5 |
| Water | 30-80 | 30-80 | 30-80 | 30-80 | 50-80 | 50-80 | 50-80 | 50-80 | 50-80 | 50-80 | 50-80 |

The method for removing biofilm, inhibiting biofilm, and/or sanitizing a surface can further comprise separately applying an oxidizing biocide either directly to the surface or to a fluid that contacts the surface. Suitable oxidizing biocides can include, but are not limited to, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, peroxides or any combination thereof. The concentration of the oxidizing biocide can be from about 10 parts per million (ppm) to about 5000 parts per million (ppm). The concentration of the oxidizing biocide can be from about 10 ppm to about 100 ppm, from about 20 ppm to about 90 ppm, from about 30 ppm to about 80 ppm, from about 40 ppm to about 70 ppm, from about 45 ppm to about 60 ppm. For example, the concentration of the oxidizing biocide can be about 50 ppm. Alternatively, the concentration of the oxidizing biocide can be from about 100 ppm to about 1000 ppm, from about 200 ppm to about 900 ppm, from about 300 ppm to about 800 ppm, from about 400 ppm to about 700 ppm, or from about 450 ppm to about 600 ppm. For example, the concentration of the oxidizing biocide can be about 500 ppm. Alternatively, the concentration of the oxidizing biocide can be from about 1000 ppm to about 5000 ppm, from about 1500 ppm to about 4500 ppm, from about 2000 ppm to about 4000 ppm, from about 2500 ppm to about 3500 ppm. For example, the concentration of the oxidizing biocide can be about 3000 ppm.

The oxidizing biocide can be applied to the surface before or after the compositions comprising the alkyl-polyglucoside. The application of the oxidizing biocide can occur immediately before or after the compositions comprising the alkyl-polyglucoside or there may be a time delay between applications. The time delay can be 1 to 60 seconds, 1 to 60 minutes, 1 to 24 hrs, or any other time optimized for the system and goals of the biofilm removal and/or sanitizing procedure. Preferably, the oxidizing biocide is applied after the compoisitions comprising the alkyl-polyglucoside.

The methods described herein can be used in any industry where it is desirable to remove biofilm or inhibit biofilm formation at a surface. The methods are particularly useful for removing/preventing biofilm and inhibiting biofouling in equipment used in the production, transportation, storage, and separation of crude oil and natural gas. The methods are also useful for inhibiting corrosion caused by biofilm buildup in equipment used in the production, transportation, storage and separation of crude oil and natural gas. The methods are also useful for removing biofilm in water systems, condensate/oil systems/gas systems, or any combination thereof. The methods are also useful for removing biofilm, preventing biofilm formation and/or sanitizing a surface used in personal care, food preparation or other consumer applications.

For example, the methods can comprise removing biofilms in oil and gas applications such as by treating a gas or liquid stream with an effective amount of a compound or composition as described herein.

In these applications, the surface can be a part of a wellbore or equipment used in the production, transportation, storage, and/or separation of a fluid such as crude oil or natural gas.

More specifically, the surface can be a part of equipment used a coal-fired process, a waste-water process, a farm, a slaughter house, a land-fill, a municipality waste-water plant, a coking coal process, or a biofuel process. Preferably, the surface can be a part of equipment used in the production of crude oil or natural gas.

The equipment can comprise a pipeline, a storage vessel, downhole injection tubing, a flow line, or an injection line.

The compositions can be applied to a gas stream used or produced in a coal-fired process, such as a coal-fired power plant.

The compositions can be applied to a gas or liquid produced or used in a waste-water process, a farm, a slaughter house, a land-fill, a municipality waste-water plant, a coking coal process, or a biofuel process.

A fluid to which the compositions can be introduced can be an aqueous medium. The aqueous medium can comprise water, gas, and optionally liquid hydrocarbon.

A fluid to which the compositions can be introduced can be a liquid hydrocarbon. The liquid hydrocarbon can be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene.

The fluid or gas can be a refined hydrocarbon product.

A fluid or gas treated with a composition can be at any selected temperature, such as ambient temperature or an elevated temperature. The fluid (e.g., liquid hydrocarbon) or gas can be at a temperature of from about 40° C. to about 250° C. The fluid or gas can be at a temperature of from −50° C. to 300° C., 0° C. to 200° C., 10° C. to 100° C., or 20° C. to 90° C. The fluid or gas can be at a temperature of 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., or 40° C. The fluid or gas can be at a temperature of 85° C., 86° C., 87° C., 88° C., 89° C., 90° C., 91° C., 92° C., 93° C., 94° C., 95° C., 96° C., 97° C., 98° C., 99° C., or 100° C.

The compositions can be added to a fluid at various levels of water cut. For example, the water cut can be from 0% to 100% volume/volume (v/v), from 1% to 80% v/v, or from 1% to 60% v/v. The fluid can be an aqueous medium that contains various levels of salinity. The fluid can have a salinity of 0% to 25%, about 1% to 24%, or about 10% to 25% weight/weight (w/w) total dissolved solids (TDS).

The fluid or gas in which the compositions are introduced can be contained in and/or exposed to many different types of apparatuses. For example, the fluid or gas can be contained in an apparatus that transports fluid or gas from one point to another, such as an oil and/or gas pipeline. The apparatus can be part of an oil and/or gas refinery, such as a pipeline, a separation vessel, a dehydration unit, or a gas line. The fluid can be contained in and/or exposed to an apparatus used in oil extraction and/or production, such as a wellhead. The apparatus can be part of a coal-fired power plant. The apparatus can be a scrubber (e.g., a wet flue gas desulfurizer, a spray dry absorber, a dry sorbent injector, a spray tower, a contact or bubble tower, or the like). The apparatus can be a cargo vessel, a storage vessel, a holding tank, or a pipeline connecting the tanks, vessels, or processing units.

The compositions can be introduced into a fluid or gas by any appropriate method for ensuring dispersal through the fluid or gas.

The compositions can be added to the hydrocarbon fluid before the hydrocarbon fluid contacts the surface.

The compositions can be added at a point in a flow line upstream from the point at which corrosion prevention and/or schmoo removal is desired.

The compositions can be injected using mechanical equipment such as chemical injection pumps, piping tees, injection fittings, atomizers, quills, and the like.

The compositions can be introduced with or without one or more additional polar or non-polar solvents depending upon the application and requirements.

The compositions can be pumped into an oil and/or gas pipeline using an umbilical line. A capillary injection system can be used to deliver the compounds/compositions to a selected fluid.

A fluid to which the compositions can be introduced can be an aqueous medium. The aqueous medium can comprise water, gas, and optionally liquid hydrocarbon. A fluid to which the compounds/compositions can be introduced can be a liquid hydrocarbon.

The compositions can be introduced into a liquid and mixed.

The compositions can be injected into a gas stream as an aqueous or non-aqueous solution, mixture, or slurry.

The fluid or gas can be passed through an absorption tower comprising compounds/compositions.

The compositions can be applied to a fluid or gas to provide any selected concentration. In practice, the compositions are typically added to a flow line to provide an effective treating dose of the composition or alkyl polyglucosides from about 0.01 to about 5,000 ppm. The compositions can be applied to a fluid or gas to provide an actives concentration of about 1 parts per million (ppm) to about 1,000,000 ppm, about 1 parts per million (ppm) to about 100,000 ppm, or about 10 ppm to about 75,000 ppm. The compositions can be applied to a fluid to provide an actives concentration of about 100 ppm to about 10,000 ppm, about 200 ppm to about 8,000 ppm, or about 500 ppm to about 6,000 ppm. The actives concentration means the concentration of the alkyl polyglucoside compound formed by the polymerization reaction of compounds having structures (1), (2), (3), and (4).

The compositions can be applied to a fluid or gas to provide an actives concentration of 0.1 ppm, 0.5 ppm, 1 ppm, 2 ppm, 5 ppm, 10 ppm, 20 ppm, 100 ppm, 200 ppm, 500 ppm, or 1,000 ppm. The compositions can be applied to a fluid or gas to provide an actives concentration of 0.125 ppm, 0.25 ppm, 0.625 ppm, 1 ppm, 1.25 ppm, 2.5 ppm, 5 ppm, 10 ppm, or 20 ppm. Each system can have its own dose level requirements, and the effective dose level of compounds/compositions to sufficiently remove biofilm or inhibit the formation of biofilms can vary with the system in which it is used.

The compositions can be applied continuously, in batch, or a combination thereof. The composition doses can be continuous to prevent biofilm formation. The compositions doses can be intermittent (i.e., batch treatment) or the compositions doses can be continuous/maintained and/or intermittent to remove and/or inhibit biofilm formation.

Dosage rates for continuous treatments typically range from about 10 to about 500 ppm, or about 10 to about 200 ppm. Continuous treatments are ideal for biofilm prevention. Preferred alkyl polyglucosides for continuous treatment include any of the alkylpolyglucoside compounds described herein. For example, suitable alkyl polyglucosides can comprise PS L 1010P, PS L 1210P, PS S 1210P, and/or PS TM 8610.

Dosage rates for batch treatments typically range from about 10 to about 400,000 ppm or about 10 to about 20,000 ppm. Batch treatments are ideal for biofilm removal. Preferred alkyl polyglucosides for batch treatment include any of the alkylpolyglucoside compounds described herein. For example, suitable alkyl polyglucosides can comprise PS L 1010P, PS L 1210P, PS S 1210P, and/or PS TM 8610. The compounds/compositions can be applied as a pill to a pipeline, providing a high dose (e.g., 20,000 ppm) of the composition.

The choice of alkylpolyglucoside can vary depending on whether a continuous treatment or batch treatment is pursued.

The flow rate of a flow line in which the compound/composition is used can be between 0 and 100 feet per second, or between 0.1 and 50 feet per second. The compounds/compositions can also be formulated with water in order to facilitate addition to the flow line.

The methods of the invention are also useful for removing biofilm or preventing biofilm formation and/or sanitizing a surface used in personal care, food preparation or other consumer applications by applying the compositions disclosed herein to an applicable surface.

The surface in personal care applications can be, for example, skin. For example, the compositions can be applied to the skin as a sanitizing solution (eg. hand sanitizer) formulated using standard additives and with an effective active concentration of the composition. Suitable additives can include, but are not limited to sequestrants, solubilizers, lubricants, buffers, cleaning agents, rinse aids, preservatives, binders, thickeners or other viscosity modifiers, processing aids, carriers, water-conditioning agents, foam inhibitors or foam generators, threshold agents or systems, aesthetic enhancing agents (i.e., dyes, odorants, perfumes), or other additives.

Other surfaces that can be treated using the methods and compositions described herein include containers, processing facilities, or equipment in the food service or food processing industries. The methods can be used to treat food packaging materials and equipment, and especially for cold or hot aseptic packaging. Examples of process facilities in which the methods can be employed include a milk line dairy, a continuous brewing system, food processing lines such as pumpable food systems and beverage lines, ware wash machines, low temperature ware wash machines, dishware, bottle washers, bottle chillers, warmers, third sink washers, processing equipment such as tanks, vats, lines, pumps and hoses (e.g., dairy processing equipment for processing milk, cheese, ice cream and other dairy products), and transportation vehicles. The methods can be used to remove biofilms in tanks, lines, pumps, and other equipment used for the manufacture and storage of soft drink materials, and can also be used in the bottling or containers for the beverages.

The methods can also be used on or in other industrial equipment and in other industrial process streams such as heaters, cooling towers, boilers, retort waters, rinse waters, aseptic packaging wash waters, and the like. The methods can be used to treat surfaces in recreational waters such as in pools, spas, recreational flumes and water slides, fountains, and the like.

The compositions can be dispensed in any suitable method generally known by one skilled in the art. For example, a spray-type dispenser can be used, such as that disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. A spray-type dispenser functions by impinging a water spray upon an exposed surface of a composition to dissolve a portion of the composition, and then immediately directing the concentrate solution including the composition out of the dispenser to a storage reservoir or directly to a point of use.

The compositions can be dispensed by immersing either intermittently or continuously in water. The composition can then dissolve, for example, at a controlled or predetermined rate. The rate can be effective to maintain a concentration of dissolved agent that is effective for use according to the methods disclosed herein.

The term "alkyl," as used herein, unless otherwise specified, refers to a linear or branched hydrocarbon radical, preferably having 1 to 32 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons). Alkyl groups include, but are not limited to, methyl, ethyl, n-propyl, isopropyl, n-butyl, iso-butyl, secondary-butyl, and tertiary-butyl. Alkyl groups may be unsubstituted or substituted by one or more suitable substituents, as defined above.

The term "alkenyl," as used herein, unless otherwise specified, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups may be unsubstituted or substituted by one or more suitable substituents, as defined above.

The term "alkylene," as used herein, unless otherwise specified, refers to a straight or branched hydrocarbon preferably having 1, 2, 3, 4, 5, 6, 7, 8, 9, 10, 11, 12, 13, 14, 15, 16, 17, 18, 19, 20, 21, or 22 carbons, optionally, possessing one or more carbon-carbon double bonds. Alkylenes may be unsubstituted or substituted by one or more suitable substituents as defined above.

The term "alkoxy," as used herein, refers to an alkyl group, as defined herein, appended to the parent molecular moiety through an oxygen atom.

The term "aryl," as used herein, means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined above.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups may be unsubstituted or substituted by one or more suitable substituents, preferably 1 to 5 suitable substituents, as defined above.

The term "coco" as used herein, refers to a mixture of unbranched alkyl chain having 8 to 18 carbon atoms that are derived from the fatty acids of coconut oil.

The term "halo" or "halogen," as used herein, refers to a fluoro, chloro, bromo or iodo radical.

The term "heteroaryl," as used herein, refers to a monocyclic, bicyclic, or tricyclic aromatic heterocyclic group containing one or more heteroatoms (e.g., 1 to 3 heteroatoms) selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2,3-oxadiazolyl), thiadiazolyl (e.g., 1,3,4-thiadiazolyl), quinolyl, isoquinolyl, benzothienyl, benzofuryl, and indolyl. Heteroaryl groups may be unsubstituted or substituted by one or more suitable substituents, preferably 1 to 5 suitable substituents, as defined above.

The term "heterocycle" or "heterocycyl," as used herein, refers to a monocyclic, bicyclic, or tricyclic group containing 1 to 4 heteroatoms selected from N, O, $S(O)_n$, $P(O)_m$, $PR_z$, NH or $NR_z$, wherein $R_z$ is a suitable substituent, n is 0 or 2, and m is 0 or 1. Heterocyclic groups optionally contain 1, 2 or 3 double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydro-thiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperidin-2-yl, piperidin-3-yl, piperazin-1-yl, piperazin-2-yl, piperazin-3-yl, 1,3-oxazolidin-3-yl, isothiazolidine, 1,3-thiazolidin-3-yl, 1,2-pyrazolidin-2-yl, 1,3-pyrazolidin-1-yl, thiomorpholin-yl, 1,2-tetrahydrothiazin-2-yl, 1,3-tetrahydrothiazin-3-yl, tetrahydrothiadiazin-yl, morpholin-yl, 1,2-tetrahydrodiazin-2-yl, 1,3-tetrahydrodiazin-1-yl, 1,4-oxazin-2-yl, and 1,2,5-oxathiazin-4-yl. Heterocyclic groups may be unsubstituted or substituted by one or more suitable substituents, preferably 1 to 3 suitable substituents, as defined above.

The term "hydroxy," as used herein, refers to an —OH group.

The term "lauryl" as used herein, refers to an unbranched alkyl chain having 12 carbons.

The term "stearyl" as used herein, refers to an unbranched alkyl chain having 18 carbons.

The term "suitable substituent," as used herein, is intended to mean a chemically acceptable functional group, preferably a moiety that does not negate the activity of the inventive compounds. Such suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C=O)— groups, heterocylic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, and arylsulfonyl groups. Those skilled in the art will appreciate that many substituents can be substituted by additional substituents.

The term "water cut," as used herein, means the percentage of water in a composition containing an oil and water mixture.

Having described the invention in detail, it will be apparent that modifications and variations are possible without departing from the scope of the invention defined in the appended claims.

EXAMPLES

The following non-limiting examples are provided to further illustrate the compositions and methods described herein.

Example 1: Use of POLY SUGA Quats as Biocides

The ability of POLY SUGA quats to act as biocides was tested. The following quats were tested: POLY SUGA Glycinate C (Sodium Bis-Hydroxyethylglycinate Coco-Glucosides Crosspolymer, herein referred to as PS-Glycinate), POLY SUGA Quat TM 8610P (Polyquaternium-77, herein referred to as PS-TM8610P), POLY SUGA Quat L-1010P (Polyquaternium-78, herein referred to as PS-L1010P), POLY SUGA Quat L1210P (Polyquaternium-80, herein referred to as PS-L1210P), and POLY SUGA Quat S1210P (Polyquaternium-79, herein referred to as PS-S1210P). Each quat was compared to an untreated sample as well as a sample treated with a nonpolymeric cationic quat used as a positive control. Each test contained *Pseudomonas aeruginosa*, grown to a final density of 1×E8 per mL of cells in 3% sodium chloride containing growth medium. 400 ppm (active) of each quat was added to the mix and incubated for 4 and 24 hrs. After this time, 10 ml aliquots of each sample were drawn for analysis.

Active microbial populations were estimated using the ACCUCOUNT method. ACCUCOUNT uses ATP concentrations measured using fluorescence to indirectly quantitate the number of active microbes in a given sample. It is assumed that each cell contains 1 fg of ATP. By correlating the detected fluorescence to a known concentration of standard-the number of bacterial cells/mL is estimated.

FIG. 1 presents the amount of microbial organisms present at each time point for each reaction condition on a logarithmic scale. Efficiency of the performance of a biocide is also reported as a % reduction, calculated by normalizing the number of bacteria detected in a treated sample to the untreated sample (Table 2). No POLY SUGA quat significantly reduced microbial population density when used alone. Thus, these polymeric quats do not appear to have biocidal properties by themselves as compared to the untreated sample. In contrast, a comparative non-polymeric cationic quat biocide provides an 87% reduction in bacteria after 4 h of contact time and 84% reduction after 24 h of contact time.

These results suggest that the POLY SUGA quats tested are themselves non-biocidal and, at these concentrations, actually increase bacterial growth (Table 2). The concentrations tested are typical of the concentrations used in a biocide treatment in the energy industry.

TABLE 2

Efficiency of polymeric gnats as a biocide

| Treatment | % reduction in bacteria | |
|---|---|---|
| | 4 Hrs. | 24 Hrs. |
| Untreated | 0 | 0 |
| PS-Glycinate | −11.369 | −8.29072 |
| PS-TM 8610 | −16.8361 | −6.96848 |
| PS L 1010P | −7.25697 | −2.91487 |
| PS L 1210P | −19.8886 | −8.49427 |
| PS S1210P | −20.0338 | −23.3573 |
| non-polymeric cationic quat | 86.63311 | 83.65546 |

Example 2: Use of POLY SUGA® Quats in Combination with Biocides

Figure 2:
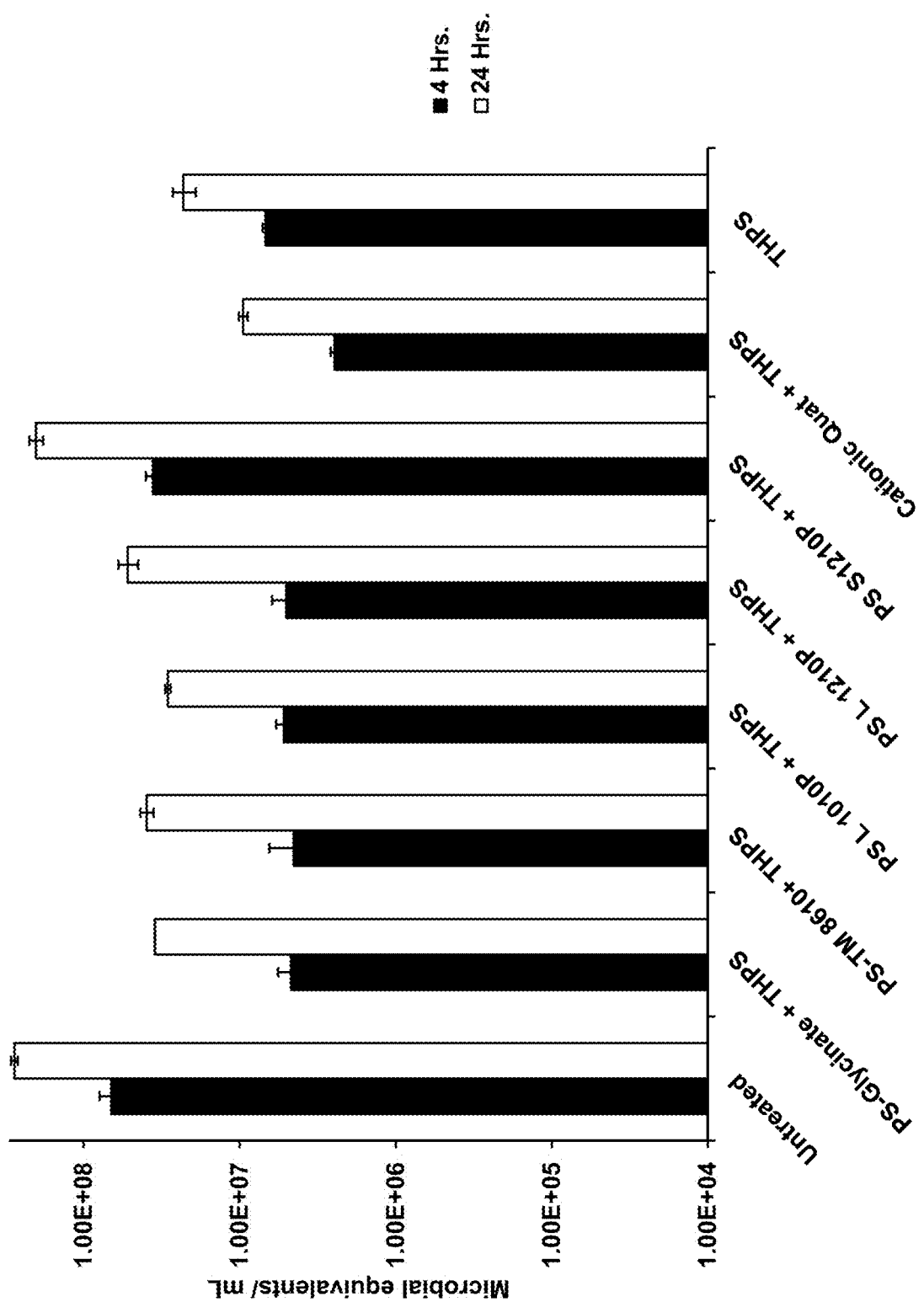
FIG. 2 is a bar graph depicting microbial population levels (planktonic) after 4 or 24 hours of treatment with individual POLY SUGA QUATs (alkyl polyglucosides) in combination with THPS (tetrakis(hydroxymethyl)phosphonium sulphate).

The ability of each quat to act together with a known biocide to reduce microbial populations was tested. Experiments were conducted as described in Example 1 with the addition of 8% THPS (tetrakis(hydroxymethyl)phosphonium sulfate) to each reaction. FIG. 2 presents the microbial population density at each time point for each condition on a logarithmic scale. THPS alone and a non-polymeric cationic quat+THPS were used as positive controls. Table 3 presents the % reduction in bacteria at each time point compared to an untreated sample. Each polymeric quat tested, except PS S1210P showed strong biocidal properties when used in combination with THPS.

TABLE 3

Efficiency of polymeric gnats blended with THPS as a biocide

| Treatment | % reduction in bacteria | |
|---|---|---|
| | 4 Hrs. | 24 Hrs. |
| Untreated | 0 | 0 |
| PS-Glycinate + THPS | 92.97326 | 87.40516 |
| PS-TM 8610 + THPS | 93.22908 | 85.80035 |
| PS L 1010P + THPS | 92.17198 | 89.60256 |
| PS L 1210P + THPS | 92.43027 | 81.19662 |
| PS S1210P + THPS | 46.08846 | 27.15215 |
| Non-polymeric cationic quat + THPS | 96.30054 | 96.56943 |
| THPS | 89.74583 | 91.72774 |

Example 3: Biofilm Removal—96 Well Plate

The ability of the POLY SUGA quat series to remove biofilm was tested using two methods. In the first experiment, a 96 well plate method adapted from existing protocols (*J Vis Exp.* 2011; (47): 2437) was used. The 96 well plate assay uses a microtiter dish where a culture of *Pseudomonas aeruginosa* was added and incubated overnight. After 48 hours, planktonic cells were removed by rinsing with a phosphate buffer saline (PBS). The plates were then treated with 100-200 µL of the test compound (polymeric quat) at 15.6 to 1000 ppm in water. After the quat treatment for 30 minutes, the plates were submerged and washed in water at least 5 times. A stock of 0.1% crystal violet solution (made in water) was added to each well. Crystal violet stains the matrix of the biofilm. Crystal violet solution was allowed to incubate for 30 minutes. After this time, the microtiter plates were washed in fresh water at least 10 times or until no blue color was observed in the wash water. After this step the microtiter plate was dried in a 37° C. oven until dry (typically 2 h). A 100-200 µL, 30% acetic acid solution was then added to each well. The mixture was incubated at room temperature for 30 minutes. Acetic acid removes the biofilm and solubilizes the matrix thus also dispersing the color adhered to the biofilm. The resulting blue color solution was transferred to a fresh microtiter plate and absorbance quantified by a plate reader. Biofilm removal was quantified by normalizing the absorbance measured in the surfactant treated well to that of the untreated wells.

Figure 3A:
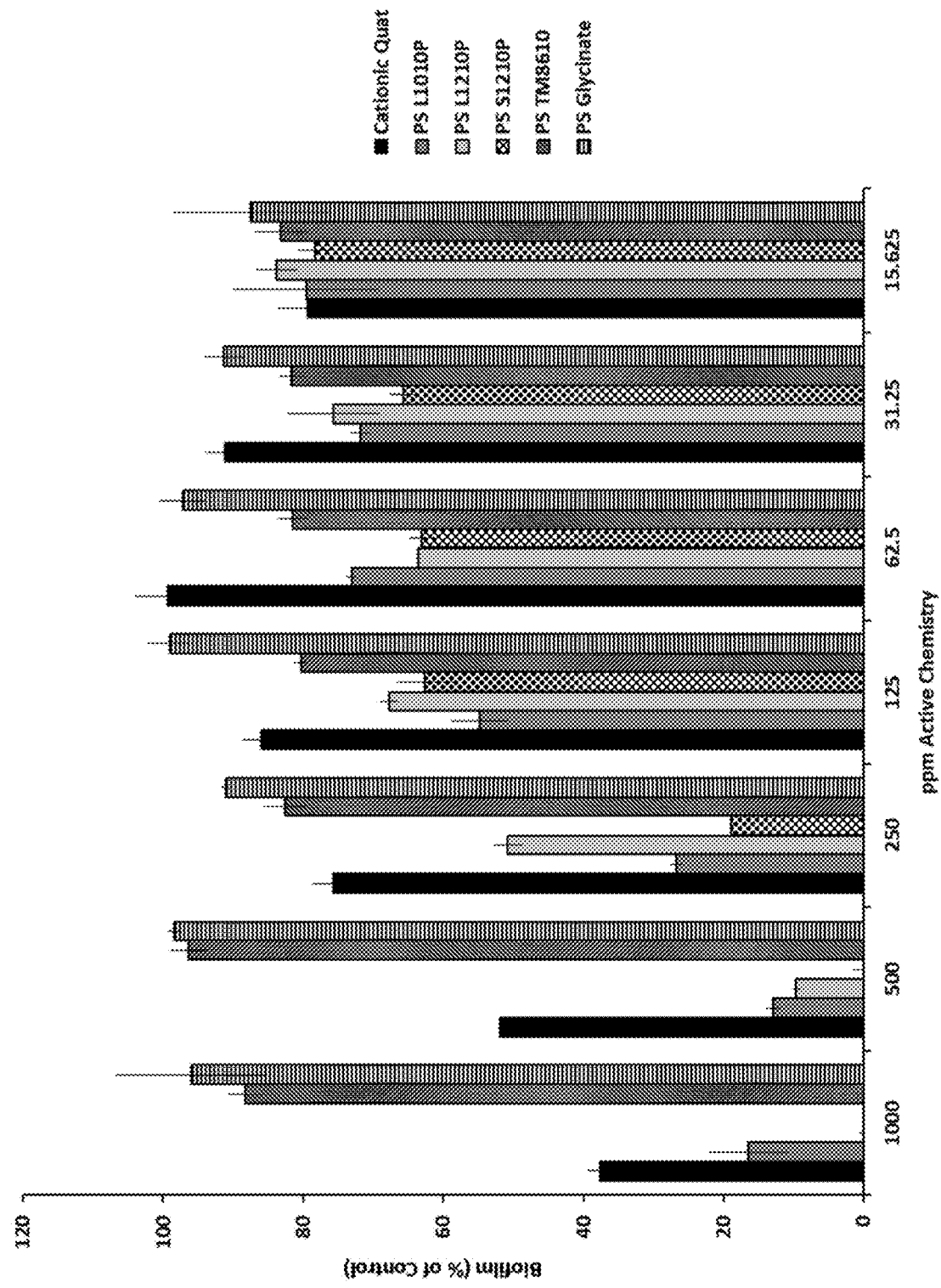
FIG. 3A is a bar graph depicting levels of biofilm (normalized to control, untreated, samples) remaining in wells following treatment with increasing concentrations of various POLY SUGA QUATs (alkyl polyglucosides).
Figure 3B:
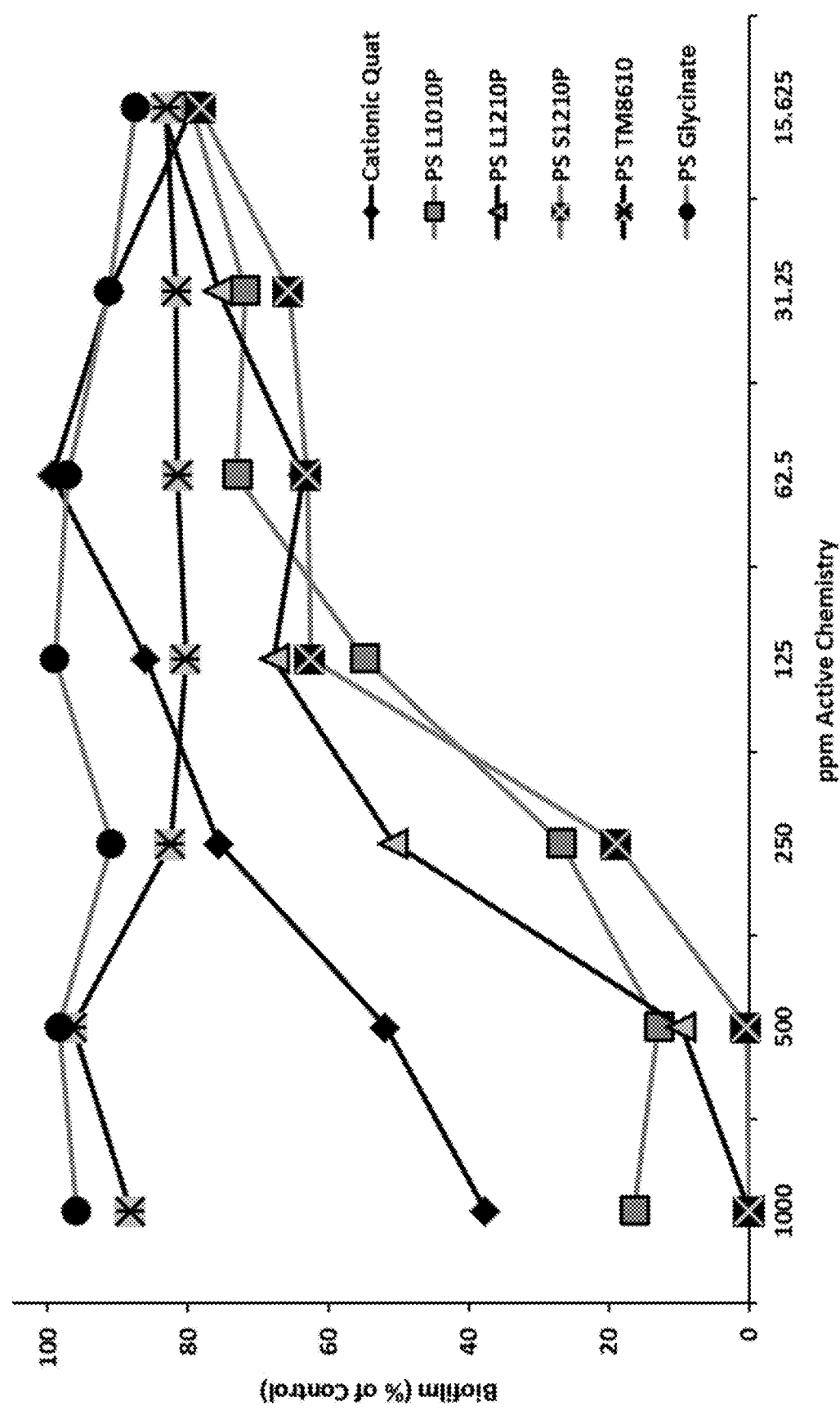
FIG. 3B is a line graph of the same data in FIG. 3A showing the percent of biofilm remaining after treatment with increasing concentrations of various POLY SUGA QUATs (alkyl polyglucosides).

FIGS. 3A and 3B show average normalized biofilm across each treatment condition. These data show that some of the POLY SUGA quats perform better than the nonpolymeric cationic quat for biofilm removal. PS L1210P and PS S1210P show superior performance at 1000 ppm with complete removal of the biofilm. Concentration dependence studies show that even at 250 ppm, PS L1010P and PS S1210P exhibit more than an 80% removal of the biofilm in comparison to only 20% removal with the nonpolymeric cationic quat. At 15.00 ppm, 4 of the 5 polymeric quats (except PS Glycinate) show at least a 20% removal of the biofilm.

Example 4: Biofilm Removal—Coupons

Figure 4:
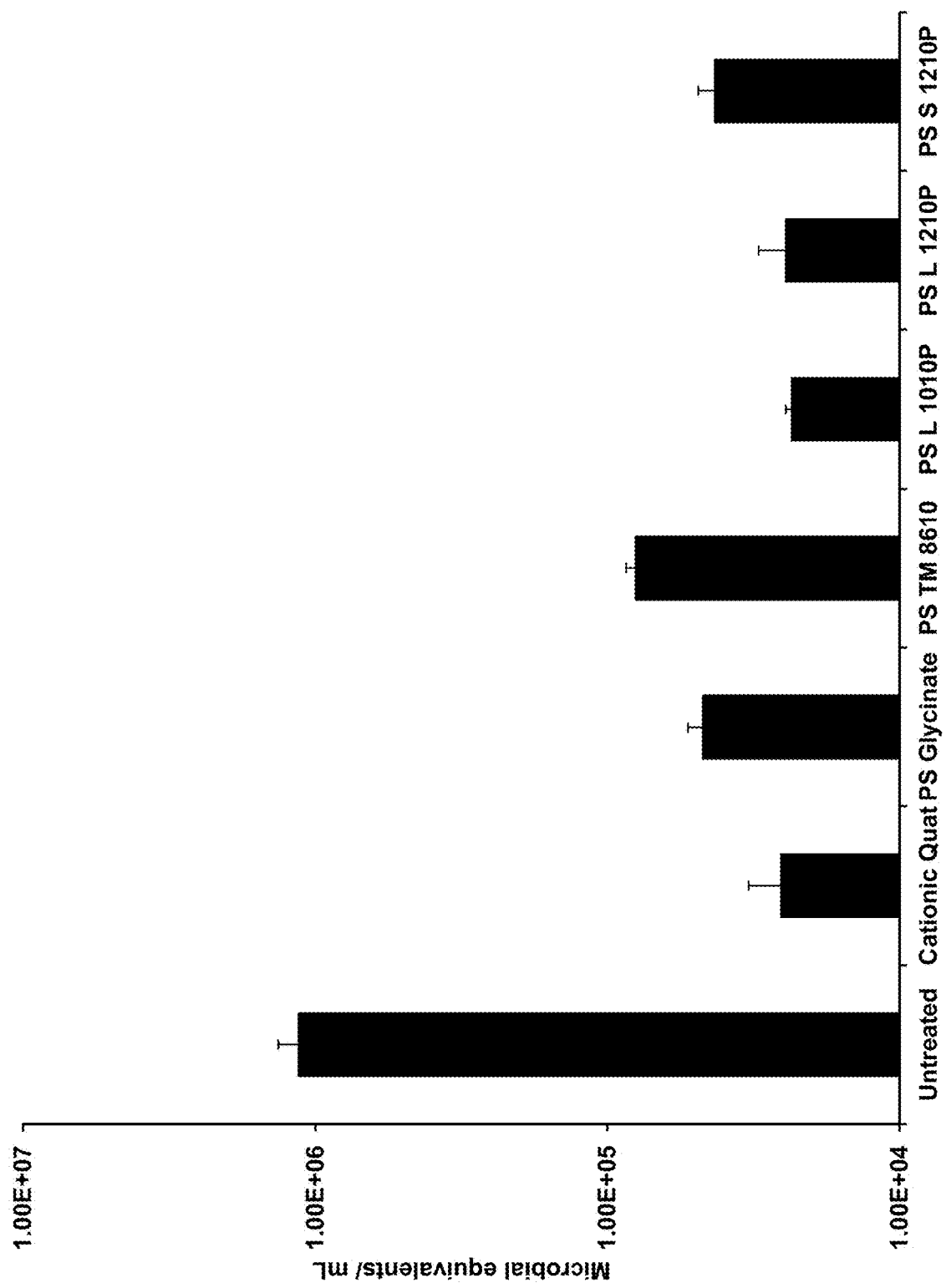
FIG. 4 is a bar graph showing the quantification of biofilms grown on stainless steel coupons (SS316) and then treated with various POLY SUGA QUATs (alkyl polyglucosides).
Figure 5:
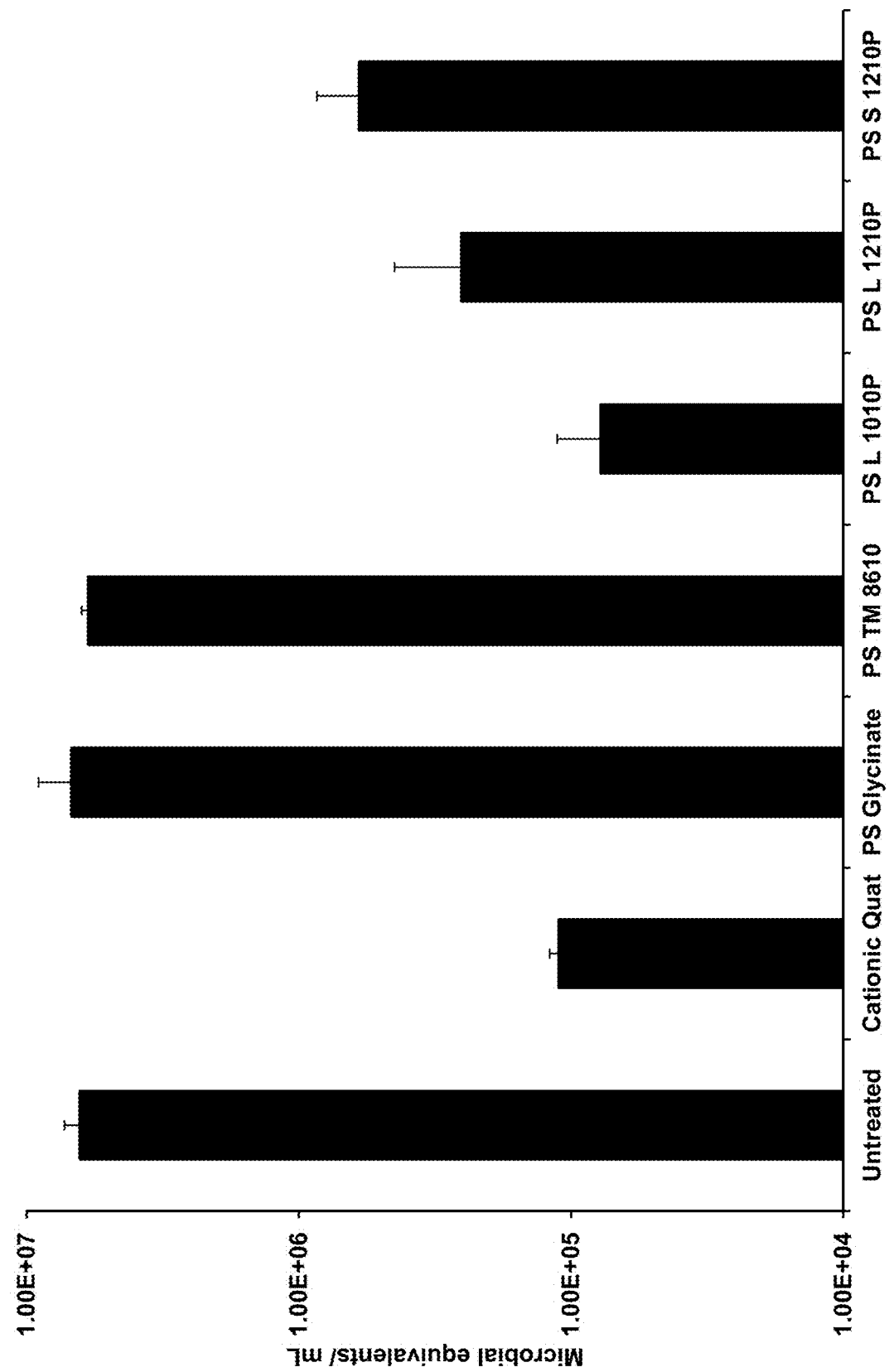
FIG. 5 is a bar graph showing the quantification of biofilms grown on polycarbonate coupons and then treated with various POLY SUGA QUATs (alkyl polyglucosides).

To corroborate the results obtained in a 96 well test, *Pseudomonas* biofilms were grown in a CDC bioreactor following the procedure described in the ASTM procedure E2562. A biofilm of *Pseudomonas* was either grown using a polycarbonate or a stainless steel (316) coupon. Each quat was added at 1000 ppm to each coupon and allowed to incubate for 30 minutes after which the coupons were sonicated in a buffered solution and ATP measured using AccuCount techniques. The measured ATP numbers were back calculated to the number of bacteria in solution. The microbial densities for each condition are plotted on a logarithmic scale in FIG. 4 (stainless steel coupons) and FIG. 5 (polycarbonate coupons). Each bar is an average obtained from three independent coupons. For the stainless steel coupons, all POLY SUGA quat solutions tested shows a decrease in the active microbial population, compared to untreated controls. This suggests that all the POLY SUGA quats tested are capable of removing biofilms from stainless steel surface. However, the nonpolymeric cationic quat, PS L 1010P and PS L 1210 P performed the best in removing biofilms. In contrast, experiments performed on poly carbonate coupons suggest that PS Glycinate and PS TM 8610P have poor biofilm removal properties on that surface. These results obtained on polycarbonate coupons correspond well with the trend observed on a 96 well plate (FIGS. 2 and 3). These results suggest that the performance of the POLY SUGA quat is influenced by the type of material that it is in contact with the biofilm.

Example 4: Biofilm Prevention

Often times when choosing a biocide, biofilm removal properties are valued but the prevention properties are overlooked. Incorrect choice of a biocide used at an inappropriate concentration can lead to an increase in biofilm growth compared to the untreated sample thus vastly increasing the risk of biofouling.

Figure 6B:
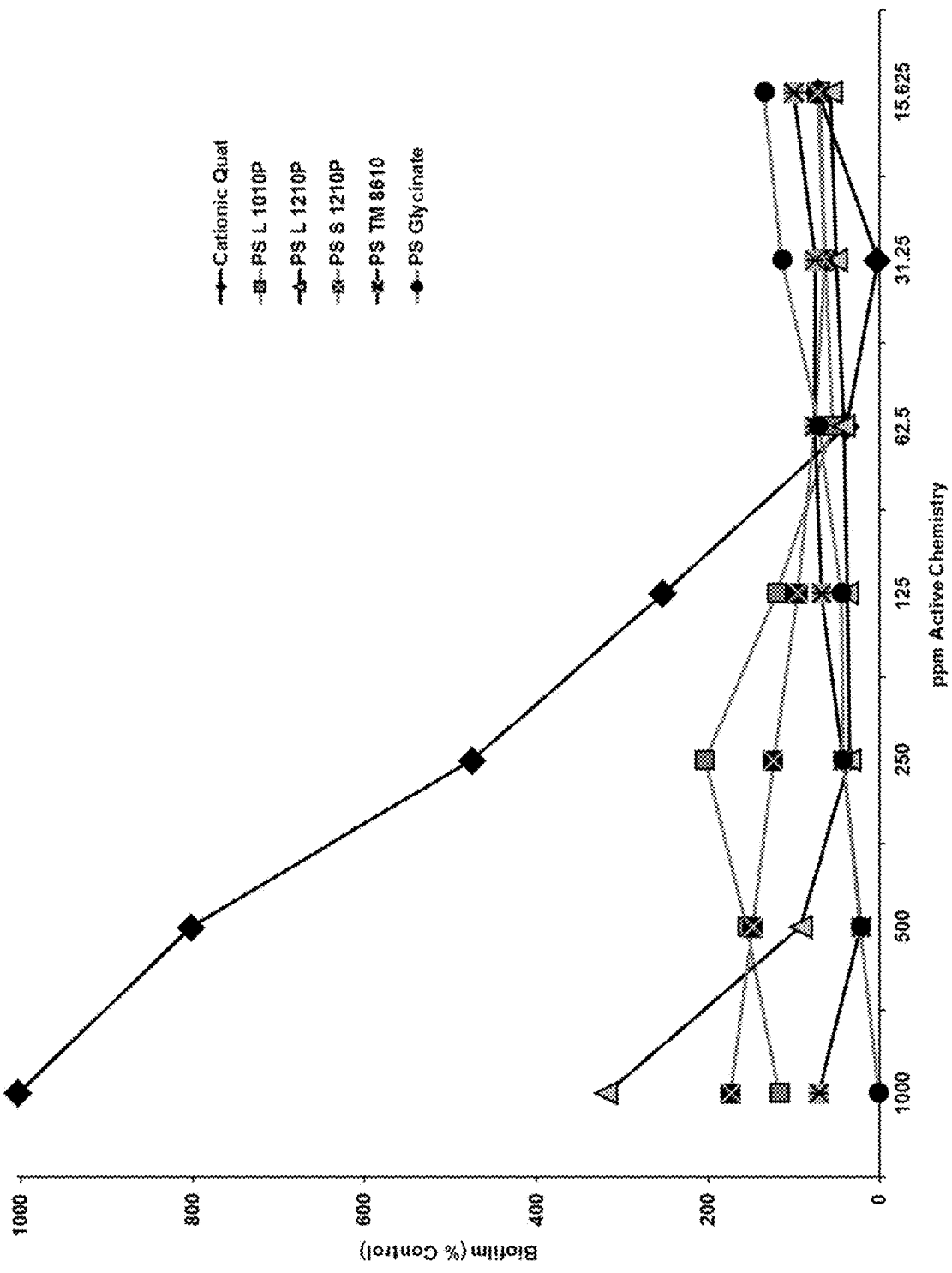
FIG. 6B is a line graph depicting the amount of biofilm grown in plastic well plates following a pretreatment with various POLY SUGA QUATS (alkyl polyglucosides).

In order to study biofilm prevention properties, 96 plate assays were used with the following modification. Before bacterial plating, a certain concentration of each polymeric quat was added to each well (15.6 to 1000 ppm) and allowed to dry overnight in a 37° C. oven. After pretreatment, an overnight culture of *Pseudomonas* was added to each well and allowed to grow for 48 hours before biofilm staining was performed using the ACCUCOUNT method described above. The percentage of biofilm observed was calculated by normalizing the growth in treated wells to that of untreated wells. FIGS. 6A and 6B shows the average normalized biofilm value across 8 wells for each condition.

Contrary to what was observed with biofilm removal experiments (Example 3), PS Glycinate and PS TM 8610 provided good biofilm prevention when used at higher concentrations (1000 or 500 ppm). In contrast, PS L1210P and the nonpolymeric cationic quat increased biofilm growth compared to the untreated sample.

Example 5: Emulsion Tendencies

Detergents have emulsifying properties when added to an oil/water system. This can be problematic especially in the oil and gas industry. Therefore it is recommended to check the emulsion tendencies of quats that are used. The emulsion tendencies of the 5 polymeric quats along with a nonpolymeric cationic quat were tested using the following protocol.

Figure 7:
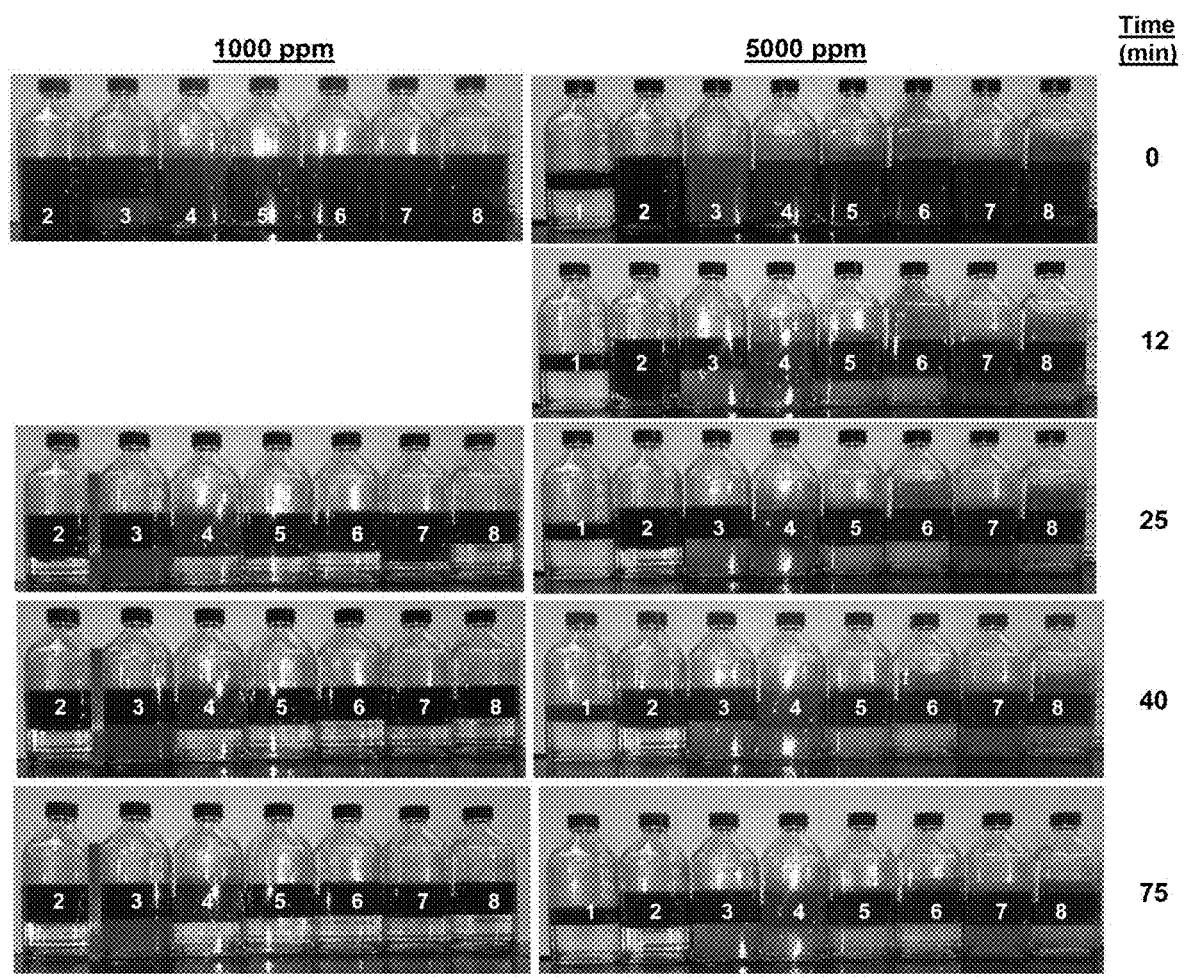
FIG. 7 depicts representative images of an emulsifying test in bottles with water, oil and one POLY SUGA QUAT treatment. Each row depicts a different time after jars were shaken. Bottles are numbered 1-8 for Unshaken, Untreated but shaken, Cationic Quat, PS L1210P (PS-L2), PS L1010P (PS-L1), PS TM8610 (PS-TM), PS S1210P (PS-S), and PS Glycinate (PS-GC), respectively.

Emulsion tests were performed using a bottle test where crude oil and water were added in a 1:1 ratio. 1000 ppm or 5000 ppm of the active quat was added and the bottles containing this mixture were shaken 100 times. Control bottles were either shaken or left unshaken. The time required for separation of the oil and water phase and the quality of water after separation were noted. The quality of water was examined through visual examination. Qualities such as haziness, clarity or 'rag' phase (not completely separated emulsion) were assessed to determine the quality of water in each sample. A well-separated water and oil phase received a "good" rating, but anything less was labeled "emulsified" or "too emulsified". The time for separation in minutes as well as the quality of water is listed in Table 4. Images of the bottles at different time points are shown in FIG. 7. The labels correspond to the quat used and the experimental condition (eg. 1: Unshaken and untreated, 2: shaken and untreated, 3: Cationic quat and shaken, 4: PS-L2 and shaken, 5: PS-L1 and shaken, 6: PS-TM and shaken, 7: PS—S and shaken, and 8: PS-GC and shaken). It is clear from these experiments (Table 4, FIG. 7) that the nonpolymeric cationic quat control has emulsion tendencies when used at 1000 or 5000 ppm. Compared to this, all the POLY SUGA quats tested showed better performance. PS L 1010P, PS L 1210P and PS S 1210P at 5000 ppm resulted in a not clear separation of the water from the oil. However four of the five quats tested, except PS L 1210P, showed that the quality of oil did not change (assessed by visual examination of the oil pre and post-treatment).

TABLE 4

| Trial | Treatment | ppm active | Separation Time (min) | Quality of water |
|---|---|---|---|---|
| 1 | Untreated | — | 75 | Good |
| 2 | Untreated | — | 75 | good |
| 1 | Cationic quat (20%) | 1000 | 7 | Too Emulsified |
| 2 | Cationic quat (20%) | 5000 | 11 | Too Emulsified |
| 1 | PS-Glycinate | 1000 | 21 | Good |
| 2 | PS-Glycinate | 5000 | >75 | Good |
| 1 | PS-TM 8610 | 1000 | 36 | Good |
| 2 | PS-TM 8610 | 5000 | >75 | Good |
| 1 | PS L 1010P (PS-L1) | 1000 | 71 | Good |
| 2 | PS L 1010P (PS-L1) | 5000 | >75 | Emulsified |
| 1 | PS L 1210P (PS-L2) | 1000 | >75 | Emulsified |
| 2 | PS L 1210P (PS-L2) | 5000 | >75 | Emulsified |
| 1 | PS S 1210P | 1000 | 60 | Good |
| 2 | PS S 1210P | 5000 | >75 | Emulsified |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

What is claimed is:

1. A method for removing biofilm on a surface, inhibiting formation of a biofilm on the surface, and/or sanitizing the surface, the method comprising either:
   contacting the surface with an effective amount of a composition, or
   adding the composition to a fluid which contacts the surface to remove at least a portion of the biofilm or inhibit formation of the biofilm on the surface,
   the composition comprising:
   a) an alkyl polyglucoside which is a reaction product of a polymerization mixture comprising compound 1, compound 2, a polymerizing agent and a functionalizing agent, the compound 1 having structure (1):

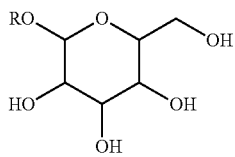

(1)

wherein R is an alkylene having 8 to 22 carbon atoms; the compound 2 having structure (2):

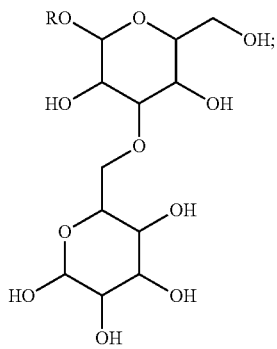

(2)

the polymerizing agent having structure (3):

Cl—CH₂CH(OH)CH₂Cl   (3);

and the functionalizing agent having structure (4):

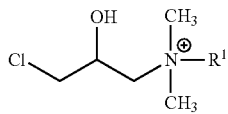

(4)

wherein $R^1$ is an alkylene having 1 to 35 carbons,
   wherein the surface is in a system used in the production, transportation, storage, and separation of crude oil and natural gas.

2. The method of claim 1, wherein R of structures (1) and (2) is an alkyl of 8 to 16 carbons, an alkyl having 8 to 10 carbons or an alkyl having 12 to 16 carbons.

3. The method of claim 1, wherein $R^1$ of structure (4) is an alkyl with 1 to 18 carbons, methyl, lauryl or stearyl.

4. The method of claim 1, wherein the alkyl polyglucoside has structure (5):

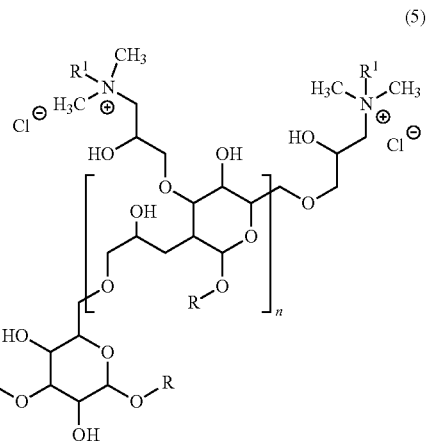

(5)

wherein each R is an alkylene having 8 to 22 carbons; each $R^1$ is an alkylene having 1 to 18 carbons; and n is an integer from 1 to 20.

5. The method of claim 4, wherein the alkyl polyglucoside has the structure (5) wherein R is decyl, lauryl or coco, and $R^1$ is methyl, lauryl, or stearyl or wherein n is an integer from 1 to 11.

6. The method of claim 1 wherein the concentration of the alkylpolyglucoside is about 1 to about 50%, about 1 to about 35%, about 5 to about 25%, or about 15 to about 25% by weight of the total composition.

7. The method of claim 1 wherein the composition further comprises a non-oxidizing biocide, a foamer, a corrosion inhibitor or any combination thereof.

8. The method of claim 7 wherein the non-oxidizing biocide comprises:
   an aldehyde, an amine type compound, a halogenated compound, a sulfur compound, a quaternary phosphonium salt, a diphenyliodonium salt or any combination thereof, or an aldehyde comprising formaldehyde, glutaraldehyde, acrolein or any combination thereof; or
   an amine type compound comprising a quaternary amine compound, cocodiamine, or any combination thereof, or
   a quaternary amine compound comprising an alkylamine, hydroxalkylamine, aklyarylamine, arylakylamine, an arylamine, or a quaternary ammonium salt; or
   a quaternary ammonium salt comprising tetramethyl ammonium chloride, tetraethyl ammonium chloride, tetrapropyl ammonium chloride, tetrabutyl ammonium chloride, tetrahexyl ammonium chloride, tetraoctyl ammonium chloride, benzyltrimethyl ammonium chloride, benzyltriethyl ammonium chloride, phenyltrimethyl ammonium chloride, phenyltriethyl ammonium chloride, cetyl benzyldimethyl ammonium chloride, hexadecyl trimethyl ammonium chloride, dimethyl alkyl benzyl quaternary ammonium compounds, monomethyl dialkyl benzyl quaternary ammonium compounds, trimethyl benzyl quaternary ammonium compounds, trialkyl benzyl quaternary ammonium compounds or any combination thereof, or a halogenated compound comprising 2-bromo-2-nitropropane-3-diol; or a sulfur compound comprising isothiazolone, a carbamate, metronidazole or any combination thereof, or a quaternary phosphonium salt comprising an alkyltris(hydroxyorgano)phosphonium salt, an alkenyltris(hydroxyorgano)phosphonium salt, tetrakis(hydroxyorgano)phosphonium salt or any combination thereof, or an alkyltris(hydroxyorgano)phosphonium salt comprising a $C_1$-$C_3$-alkyltris(hydroxymethyl)phosphonium salt; or an alkenyltris(hydroxyorgano)phosphonium salt comprising a $C_2$-$C_3$-alkenyltris(hydroxymethyl)phosphonium salt; or a tetrakis(hydroxyorgano)phosphonium salt comprising tetrakis(hydroxymethyl)-phosphonium sulfate (THPS), tetrakis(hydroxymethyl)phosphonium chloride, tetrakis(hydroxymethyl)phosphonium phosphate, tetrakis(hydroxymethyl)phosphonium formate, tetrakis(hydroxymethyl)phosphonium acetate, tetrakis(hydroxymethyl)phosphonium oxalate or any combination thereof, or a phosphonium salt comprising tetrakis(hydroxymethyl) phosphonium sulphate (THPS); or a diphenyliodonium salt comprising diphenyliodonium chloride, diphenyliodonium nitrate, diphenyliodonium bromide, diphenyliodonium iodide, diphenyliodonium hexafluorophosphate, diphenyliodonium perchlorate, diphenyliodonium hexafluoroarsenate, or a combination thereof; or THPS, glutaraldehyde, 2,2-dibromo-3-nitrilopropionamide (DBNPA), isothiazoline, tris(hydroxymethyl)nitromethane (THNM) or any combination thereof.

9. The method of claim 7 wherein the non-oxidizing biocide is present at a concentration of about 1 to about 50%, about 1 to about 25%, about 5 to about 20%, or about 5 to about 15% by weight based on the total weight of the composition.

10. The method of claim 7 wherein the corrosion inhibitor comprises:

an imidazoline compound, a quaternary ammonium compound, a pyridinium compound, a phosphate ester, an alkoxylated amine, a phosphate ester, or a monomeric or oligomeric fatty acid or a combination thereof; or one or more of the following imidazoline compounds:

(A) an imidazoline of Formula (7):

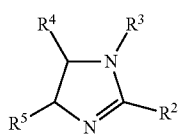

(7)

wherein $R^2$ is a $C_1$-$C_{20}$ alkyl or a $C_1$-$C_{20}$ alkoxyalkyl group;

$R^4$ and $R^5$ are independently hydrogen or a $C_1$-$C_6$ alkyl group, $R^3$ is hydrogen, $C_1$-$C_6$ alkyl, $C_1$-$C_6$ hydroxyalkyl, or $C_1$-$C_6$ arylalkyl; and (B) an imidazolinium salt of Formula (8):

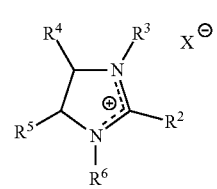

(8)

wherein $R^2$ is a $C_1$-$C_{20}$ alkyl or a $C_1$-$C_{20}$ alkoxyalkyl group;

$R^4$ and $R^5$ are independently hydrogen or a $C_1$-$C_6$ alkyl group, $R^3$ and $R^6$ are independently hydrogen, $C_1$-$C_6$ alkyl, $C_1$-$C_6$ hydroxyalkyl, or $C_1$-$C_6$ arylalkyl; and $X^-$ is a halide, carbonate, sulfonate, phosphate, or an anion of an organic carboxylic acid;

or a tautomer thereof;

(C) a bis-quaternized imidazoline compound of Formula (9):

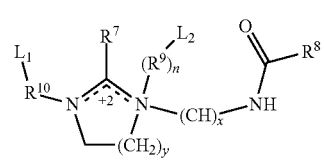

(9)

wherein:

$R^7$ and $R^8$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof;

$R^9$ and $R^{10}$ are each independently unsubstituted branched, chain or ring alkylene or alkenylene having from 1 to about 29 carbon atoms; partially or fully oxygenized, sulfurized, 7 of 20 and/or phosphorylized branched, chain, or ring alkylene or alkenylene having from 1 to about 29 carbon atoms; or a combination thereof;

$L_1$ and $L_2$ are each independently absent, H, —COOH, —$SO_3H$, —$PO_3H_2$, —$COOR_{11}$, —$CONH_2$, —$CONHR^{11}$, or —$CON(R^{11})_2$;

$R^{11}$ is each independently a branched or unbranched alkyl, aryl, alkylaryl, alkylheteroaryl, cycloalkyl, or heteroaryl group having from 1 to about 10 carbon atoms;

n is 0 or 1, and when n is 0, $L_2$ is absent or H;

x is from 1 to about 10; and y is from 1 to about 5; or (D) a combination thereof; or the imidazoline of Formula (7) or the imidazolinium salt of Formula (8), wherein $R^2$ is an found alkyl mixture found in tall oil fatty acid (TOFA), $R^3$ is benzyl, $R^4$ and $R^5$ are each hydrogen, $R^6$ is hydroxyethyl, and $X^-$ is chloride; or the bis-quaternized imidazoline compound of formula (9), wherein $R^7$ and $R^8$ are derived from a mixture of tall oil fatty acids and are predominantly a mixture of $C_{17}H_{33}$ and $C_{17}H_{31}$, x is 2, y is 1, $R^9$ and $R^{10}$ are —$C_2H_2$—, n is 1, and $L_1$ and $L_2$ are —$CO_2H$, —$SO_3H$, or —$PO_3H_2$; or the bis-quaternized imidazoline compound of formula (9), wherein $R^7$ and $R^8$ are each independently $C_{16}$-$C_{18}$ alkyl; $R_{10}$ is —$C_2H_2$—; x is 2; y is 1; n is 0; $L_1$ is —$COOH$, —$SO_3H$, or —$PO_3H_2$ and $L_2$ is absent or H; or a pyridinium compound of Formula (10):

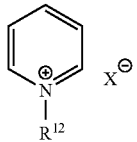

(10)

wherein
$R^{12}$ is an alkyl group, an aryl group, or an arylalkyl group, wherein said alkyl groups have from 1 to about 18 carbon atoms; and
$X^-$ is a halide; or
the pyridinium compound of Formula (10), wherein $R^{12}$ is benzyl, and $X^-$ is chloride; or
the quaternary ammonium salt and the bis-quaternized imidazoline compound of Formula (9); or
a quaternary ammonium compound of Formula (11):

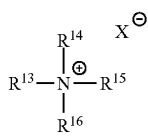

(11)

wherein
$R^{13}$, $R^{14}$, and $R^{15}$ are independently $C_1$ to $C_{20}$ alkyl, $R^{16}$ is methyl or benzyl, and $X^-$ is a halide or methosulfate; or
a quaternary ammonium compound comprising a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, a trimethyl benzyl quaternary ammonium salt, or a trialkyl benzyl quaternary ammonium salt, wherein the alkyl group has 6 to 24 carbon atoms; or
an alkoxylated amine, a phosphate ester, or a monomeric or oligomeric fatty acid; or
an alkoxylated amine comprising ethoxylated tallow amine.

11. The method of claim 7 wherein the concentration of the corrosion inhibitor is about 1 to about 50%, about 1 to about 25%, about 5 to about 20%, or about 5 to about 10% by weight of the composition.

12. The method of claim 7 wherein the foamer comprises:
an anionic surfactant, a cationic surfactant, a nonionic surfactant, an amphoteric surfactant, a zwitterionic surfactant, a fluoro-surfactant or any combination thereof; or
an anionic surfactant comprising an alkyl carboxylate, an alkyl sarcosinate, an alkyl sulfosuccinate, a sulfosuccinamate, an alkyl phosphate, an alkyl sulfonate, an alkyl sulfate or any combination thereof; or
an alkyl carboxylate comprising a fatty carboxylate or an alkyl ether carboxylate; or
an alkyl sulfosuccinate comprising a monoalkylsulfosuccinate or a dialkylsulfosuccinate; or
an alkyl phosphate comprising an alkyl phosphate ester or an ethoxylated alkyl phosphate ester; or
an alkyl sulfonate comprising an alkyl aryl sulfonate, an ester sulfonate, an olefin sulfanate, or a paraffin sulfonate; or
an ester sulfonate comprising a C12-C18 ester sulfonate; or
an olefin sulfonate comprising a C14-C24 alpha olefin sulfonate or a C15-C17 internal olefin sulfonate; or
an alkyl sulfate comprising an alcohol sulfate or an alcohol ether sulfate; or
an alcohol ether sulfate comprising a C13-C18 alcohol ether sulfate; or
a cationic surfactant comprising a quaternary amine or quaternary ammonium salt thereof; or
a quaternary amine comprising a monoalkyl quaternary amine, dialkyl quaternary amine, an alkyltrimethyl quaternary ammonium salt, an alkyl dimethyl benzyl quaternary ammonium salt, an imidazolinium salt or any combination thereof; or
a monoalkyl quaternary amine comprising cocotrimonium chloride, soyatrimonium chloride, stearyltrimonium chloride, behentrimonium chloride or any combination thereof; or
a dialkyl quaternary amine comprising a dialkyl dimethyl quaternary ammonium salt; or
a dialkyl dimethyl quaternary ammonium salt comprising dicetyldimethyl ammonium chloride, dicocodimethyl ammonium chloride, distearyldimethyl ammonium chloride or any combination thereof; or
a nonionic surfactant comprising an alkoxylate, an amine oxide, a sorbitan ester, a carboxylic compound, a polyalkoxylated glyceride or any combination thereof; or
an alkoxylate comprising an alkoxylated alcohol or ether, an alkylphenol alkoxylate, or an alkyl ethoxylate; or
an amine oxide comprising an alkyl dimethyl amine oxide, an alkyl-bis (2-hydroxyethyl) amine oxide, an alkyl amidopropyl dimethyl amine oxide, or an alkylamidopropyl-bis(2-hydroxyethyl) amine oxide; or
a sorbitan ester comprising a polyalkoxylated sorbitan ester; or
a carboxylic compound comprises a carboxylic acid or a carboxylic ether; or
an amphoteric surfactant comprising a betaine, a sultaine, an alkylamphoacetate, an amphodiacetate, an alkylamphopropionate, an alkyliminodipropionate, or an amphodipropionate; or
a betaine comprising an alkyl betaine, an alkylamido betaine, or a sulfobetaine; or
an alkyl betaine comprising alkyl dimethyl betaine; or
an alkyamido betaine comprising an alkylamido propyl betaine; or
an alkylamido propyl betaine comprising cocoamido propyl betaine, a capryloamidopropyl betaine, or a caprylamidopropyl betaine; or
a sulfobetaine comprising N-decyl-N,N-dimethyl-3-ammonio-1-propanesulfonate or dimethyl-(2-hydroxyethyl)-(3-sulfopropyl) ammonium; or
a sultaine comprising an alkylamidopropyl hydroxysultane; or an alkylamidopropyl hydroxysultane comprising lauramidopropyl hydroxysultaine; or an amphoacetate comprising an alkylamphoacetate; or a fluoro-surfactant.

13. The method of claim 1 wherein the composition further comprises an additional component, wherein the additional component is an organic solvent, an asphaltene inhibitor, a paraffin inhibitor, a scale inhibitor, a water clarifier, a dispersant, an emulsion breaker, a pH modifier, a surfactant, a hydrogen sulfide scavenger, a gas hydrate inhibitor, a kinetic hydrate inhibitor or any combination thereof.

14. The method of claim 13 wherein the additional component is present in an amount of about 0.1 to about 50 wt % based on the total weight of the composition.

15. The method of claim 1 wherein the composition further comprises water; a non-oxidizing biocide; a corrosion inhibitor; or an organic solvent and water.

16. The method of claim 1 further comprising sequentially contacting the surface with an oxidizing biocide.

17. The method of claim 16 wherein the oxidizing biocide comprises sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, peroxides or any combination thereof.

18. The method of claim 16 wherein the concentration of the oxidizing biocide is about 10 parts per million (ppm) to about 5000 parts per million (ppm).

* * * * *